(12) United States Patent
Fu et al.

(10) Patent No.: US 9,847,859 B2
(45) Date of Patent: Dec. 19, 2017

(54) DATA MAPPING AND MULTIPLEXING METHOD AND DEVICE AND DATA DEMULTIPLEXING AND DEMAPPING METHOD AND DEVICE

(71) Applicant: ZTE Corporation, Shenzhen (CN)

(72) Inventors: Xihua Fu, Shenzhen (CN); Xinling Zhang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 169 days.

(21) Appl. No.: 14/768,324

(22) PCT Filed: Feb. 13, 2014

(86) PCT No.: PCT/CN2014/072047
§ 371 (c)(1),
(2) Date: Aug. 17, 2015

(87) PCT Pub. No.: WO2014/124596
PCT Pub. Date: Aug. 21, 2014

(65) Prior Publication Data
US 2016/0006545 A1    Jan. 7, 2016

(30) Foreign Application Priority Data

Feb. 18, 2013   (CN) .......................... 2013 1 0052746

(51) Int. Cl.
*H04L 5/00*   (2006.01)
*H04J 14/02*  (2006.01)
(Continued)

(52) U.S. Cl.
CPC .......... *H04L 5/0046* (2013.01); *H04J 3/1658* (2013.01); *H04J 14/0227* (2013.01);
(Continued)

(58) Field of Classification Search
None
See application file for complete search history.

(56) References Cited

U.S. PATENT DOCUMENTS

| | | | |
|---|---|---|---|
| 2007/0071443 A1 | 3/2007 | Fukumitsu | |
| 2007/0189336 A1* | 8/2007 | Zou ........................... | H04J 3/07 370/505 |
| 2010/0098415 A1* | 4/2010 | Jiang ................. | H04L 12/40032 398/45 |

FOREIGN PATENT DOCUMENTS

| | | |
|---|---|---|
| CN | 1741429 A | 3/2006 |
| CN | 101547057 A | 9/2009 |

(Continued)

OTHER PUBLICATIONS

International Search Report for corresponding application PCT/CN2014/072047 filed Feb. 13, 2014; dated Apr. 30, 2014.

*Primary Examiner* — Charles C Jiang
*Assistant Examiner* — George Atkins, Jr.
(74) *Attorney, Agent, or Firm* — Cantor Colburn LLP

(57) ABSTRACT

Provided are a method and device for mapping, multiplexing, demapping and demultiplexing data are provided. The method includes: mapping an Ethernet service data stream the rate of which is m*100 Gb/s sequentially into m Optical Payload Unit Sub-frames (OPUC) and multiplexing the m OPUC into an Optical Payload Unit Frame (OPUCm) the rate of which is m*100 Gb/s according to the way of byte interleave; and adding an Optical Channel Data Unit (ODU) overhead to the head of the OPUCm to obtain an Optical Channel Data Unit Frame (ODUCm) the rate of which is m*100 Gb/s, wherein the frame structure of the OPUC consists of 4 rows and 3810 columns; the frame structure of the OPUCm consists of 4 rows and 3810*m columns; and the frame structure of the ODUCm consists of 4 rows and 3824*m columns, wherein m is a positive integer. The (Continued)

present disclosure improves the spectrum efficiency of optical fibers and the systematic flexibility and the compatibility.

18 Claims, 15 Drawing Sheets

(51) Int. Cl.
    *H04Q 11/00*     (2006.01)
    *H04J 3/16*     (2006.01)

(52) U.S. Cl.
    CPC ........ *H04J 14/0256* (2013.01); *H04L 5/0053* (2013.01); *H04Q 11/0066* (2013.01); *H04J 14/0224* (2013.01); *H04Q 2011/0086* (2013.01)

(56) References Cited

FOREIGN PATENT DOCUMENTS

| | | |
|---|---|---|
| CN | 101834688 A | 9/2010 |
| CN | 102820951 A | 12/2012 |

* cited by examiner

DATA MAPPING AND MULTIPLEXING METHOD AND DEVICE AND DATA DEMULTIPLEXING AND DEMAPPING METHOD AND DEVICE

TECHNICAL FIELD

The present disclosure relates to the communication field, in particular to a data mapping and multiplexing method and device, and a data demultiplexing and demapping method and device.

BACKGROUND

The development of optical transmission technology presents a trend towards a higher rate on a single channel (e.g. the transmission at 400G/1T on a single channel), a higher spectrum efficiency and a high-order modulation format, thus, the most definite and important development direction of optical transmission technology still lies in continuing increasing transmission rate. High-speed transmission confronts a lot of limitations mainly in two aspects: aspect 1, optical transmission technology is developing towards convergence transmission of high spectrum efficiency and high-speed service interface transmission, if spectrum efficiency cannot be improved further, then the convergence of low speed to a high-speed channel for retransmission is not much meaningful, nonetheless, because there may be a high-speed Ethernet interface at a client side, the transmission of a high-speed interface still needs to be taken into consideration, thus, 400G will be the critical point of the limit of spectrum efficiency; aspect 2, as optical transmission technology is developing towards long-distance (long-span and multi-span) transmission, although the adopted approaches of the use of a low-loss fiber, the use of a low-noise amplifier and the shortening of spans, etc. can improve the Optical Signal-Noise Ratio (OSNR) of a system, the improvement is limited and it is difficult to make a breakthrough, in addition, it is also difficult to implement these approaches in engineering.

With the bandwidth of a bearer network required to be higher and higher, a beyond-100G technology becomes a solution to meeting the requirement for bandwidth increment; the Wavelength Division Multiplexing (WDM) of the conventional 50 GHz Fixed Grid cannot provide a sufficient spectrum width to realize a beyond-100G technology, no matter a 400G technology or a 1T technology. Due to the defects of the Fixed Grid, a wider Flexible Grid is needed.

In related technologies, beyond-100G multi-rate hybrid transmission and the flexibility of the modulation format for beyond-100G transmission have different requirements on channel bandwidth, if a proper bandwidth is customized for each channel, then the bandwidth of a system can be fully used, thereby generating a Flexible Grid system. The requirement for an ultra high-speed WDM system brought by continually increasing demands for bandwidth leads to a demand for a Flexible Grid technology, however, how to effectively plan and manage frequency spectrum and how to realize the compatibility of the introduced Flexible Grid technology with existing systems remain to be solved.

No effective solution has been proposed to address the problem of how to effectively map and multiplex data after a Flexible Grid is introduced into the related art.

SUMMARY

A data mapping and multiplexing scheme and a demultiplexing and demapping scheme is provided in the present disclosure to at least address the problem of how to effectively map and multiplex data after a Flexible Grid technology is introduced into the related art.

In accordance with an aspect of the present disclosure, a data mapping and multiplexing method is provided which includes: mapping an Ethernet service data stream a rate of which is m*100 Gb/s sequentially into m Optical Payload Unit Sub-frames (OPUC) and multiplexing the m OPUC into one Optical Payload Unit Frame (OPUCm) a rate of which is m*100 Gb/s according to a way of byte interleave; adding an Optical Channel Data Unit (ODU) overhead to a head of the OPUCm to obtain an Optical Channel Data Unit Frame (ODUCm) a rate of which is m*100 Gb/s, wherein a frame structure of each frame of the m OPUC consists of 4 rows and 3810 columns, a frame structure the OPUCm consists of 4 rows and 3810*m columns, and a frame structure of the ODUCm consists of 4 rows and 3824*m columns, where m is a positive integer.

In an example embodiment, multiplexing the m OPUC into the one OPUCm the rate of which is m*100 Gb/s according to the way of byte interleave includes: sequentially extracting the bytes of each column of the m OPUC, starting from the bytes of the first column and ending with bytes of the last column; and sequentially combing groups of multiplexed bytes to obtain the OPUCm the rate of which is m*100 Gb/s, wherein each group of the groups of multiplexed bytes consists of bytes extracted from the same column of various frames of the m OPUC.

In an example embodiment, sequentially combing the groups of multiplexed bytes, wherein each group of the groups of multiplexed bytes consists of the bytes extracted from the same column of various frames of the m OPUC includes: using content of a byte area which is extracted from the kth column of the ith sub-frame of the m OPUC as content of a byte area of the [m*(k−1)+$C_i$]th column of the multiplexed OPUCm the rate of which is m*100 Gb/s, where i and k are both integers; 1≤i≤m; 1≤k≤3810; $C_i$ denotes a sequence of a interleave byte of the ith OPUC into the OPUCm, $C_i$∈{1, 2, 3, m−1, m}, and a value of each $C_i$ is different.

In an example embodiment, the method further includes: sequentially carrying, in byte areas from the first column to the mth column in the fourth row of overhead of each even-numbered OPUCm, m sequence values $C_i$ denoting the sequences of interleaving the bytes of various OPUC into the OPUCm, wherein content of the byte areas from the first column to the mth column in the fourth row of the overhead of the OPUCm forms a Payload Structure Identifier (PSI) which denotes the sequences of interleaving the bytes of various OPUC into the OPUCm.

In an example embodiment, after the ODU overhead is added to the head of the OPUCm to obtain the ODUCm the rate of which is m*100 Gb/s, the method further includes: multiplexing a plurality of the ODUCm into one ODUCn according to the way of byte interleave, wherein a rate of the ODUCn is a sum of rates of the plurality of the ODUCm and marked as n*100 Gb/s, where n is a positive integer, and m<=n; and adding an Optical Channel Transport Unit (OTU) overhead to a head of the ODUCn to obtain an Optical Channel Transport Unit Frame (OTUCn).

In an example embodiment, multiplexing the plurality of ODUCm into one ODUCn according to the way of byte interleave includes: sequentially adding r ODUCm, rates of which are $m_1$*100 Gb/s, $m_2$*100 Gb/s, $m_3$*100 Gb/s . . . $m_{(r−1)}$*100 Gb/s and $m_r$*100 Gb/s respectively, into the one ODUCn according to the way of byte interleave, wherein content of byte areas from the [[$m_x$*(k−1)]th column to the $[m_x*(k-1)+m_x]$th column of an ODUCm$_x$ is used as content of byte areas from the $[n*(k-1)+m_1+m_2+\ldots+m_{(x-1)}+1]$th column to the $[n*(k-1)+m_1+m_2+\ldots+m_{(x-1)}+m_x]$th column of the multiplexed ODUCn, where $m_1, m_2, m_3 \ldots m_{(r-1)}$ and $m_r$ are all positive integers; $m_1+m_2+m_3+\ldots+m_{(r-1)}+m_r=n$; $1 \le k \le 3824$; $x \le r$; x, r and k are all positive integers; when the value of m is 1, the ODUCm denotes ODU4; and $m_x \in \{m_1, m_2, m_3, \ldots, m_{(r-1)}, m_r\}$.

In accordance with another embodiment of the present disclosure, a method for demultiplexing and demapping the data mapped and multiplexed by foregoing mapping and multiplexing method is provided which includes: obtaining the OPUCm by removing the ODU overhead from the received ODUCm, and demultiplexing the m OPUC from the OPUCm according to the way of byte interleave, wherein content of the byte area of the $[m*(k-1)+i]$th column in the OPUCm is used as content of the byte area of the kth column of the PS[i]th OPUC according to the values of the PSI[1], the PSI[2] . . . the PSI[m] formed by content from the first column to the mth column in the fourth row of the received even-numbered OPUCm; and sequentially demapping the m demultiplexed OPUC into the one Ethernet service data stream the rate of which is m*100 Gb/s, wherein PSI[i] denotes that the sequence of interleaving the bytes of the PSI[i]th OPUC into the OPUCm is i.

In accordance with still another embodiment of the present disclosure, a method for demultplexing and demapping the data mapped and multiplexed by the foregoing mapping and multiplexing method is provided, which includes: obtaining the r ODUCm$_x$ contained in one ODUCn received, wherein according to the way of byte interleave, content of the byte areas from the $[n*(k-1)+m_1+m_2+\ldots+m_{(x-1)}+1]$th column to the $[n*(k-1)+m_1+m_2+\ldots+m_{(x-1)}+m_x]$th column of the ODUCn sequentially is used as content of the byte areas from the $[[m_x*(k-1)+1]$th column to the $[m_x*(k-1)+m_x]$th column of the ODUCm$_x$.

In accordance with yet another embodiment of the present disclosure, an optical signal sending node is provided which includes: a mapping component configured to map an Ethernet service data stream a rate of which is m*100 Gb/s sequentially into m OPUC, wherein a frame structure of the OPUC consists of 4 rows and 3810 columns, where m is a positive integer; a first multiplexing component configured to multiplex the m OPUC into one OPUCm a rate of which is m*100 Gb/s according to byte interleave, wherein the frame structure of the OPUCm consists of 4 rows and 3810*m columns; and a first framing component configured to add an ODU overhead to a head of the OPUCm to obtain an ODUCm a rate of which is m*100 Gb/s, wherein a frame structure of the ODUCm consists of 4 rows and 3824*m columns.

In an example embodiment, the first multiplexing component further includes: an extraction unit configured to sequentially extract bytes of each column of the m OPUC, starting from bytes of the first column and ending with bytes of the last column, and a first byte interleave unit configured to sequentially combine groups of multiplexed bytes to obtain the OPUCm the rate of which is m*100 Gb/s, wherein each group of the groups of multiplexed bytes consists of bytes extracted from the same column of various frames of the m OPUC.

In an example embodiment, the first byte interleave unit is further configured to use content of a byte area which is extracted from the kth column of the ith sub-frame of the m OPUC as content of a byte area of the $[m*(k-1)+C_i]$th column of the multiplexed OPUCm the rate of which is m*100 Gb/s, wherein i and k are both integers; $1 \le i \le m$; $1 \le k \le 3810$; $C_i$ denotes a sequence of interleave bytes of the ith OPUC into the OPUCm, $C_i \in \{1, 2, 3, \ldots, m-1, m\}$, and a value of each $C_i$ is different.

In an example embodiment, the first byte interleave unit is further configured to sequentially carry, in byte areas from the first column to the mth column in the fourth row of overhead of even-numbered OPUCm, m sequence values $C_i$ denoting the sequences of interleaving the bytes of various OPUC into the OPUCm, wherein content of byte areas from the first column to the mth column in the fourth row of the overhead of the OPUCm forms a Payload Structure Identifier (PSI) which denotes the sequences of interleaving the bytes of various OPUC into the OPUCm.

In an example embodiment, the optical signal sending node further includes: a second multiplexing unit configured to multiplex a plurality of the ODUCm into one ODUCn according to the way of byte interleave, wherein a rate of the ODUCn is a sum of the rates of the plurality of the ODUCm and marked as n*100 Gb/s, where n is a positive integer, and m<=n; and a second framing component configured to add an OTU overhead to a head of the ODUCn to obtain an OTUCn.

In an example embodiment, the second multiplexing component is further configured to sequentially add r ODUCm$_s$, the rates of which are $m_1*100$ Gb/s, $m_2*100$ Gb/s, $m_3*100$ Gb/s . . . $m_{(r-1)}*100$ Gb/s and $m_r*100$ Gb/s respectively, into the one ODUCn according to the way of byte interleave, wherein the content of byte areas from the $[[m_x*(k-1)]$th column to the $[m_x*(k-1)+m_x]$th column of an ODUCm$_x$ is used as content of byte areas from the $[n*(k-1)+m_1+m_2+\ldots+m_{(x-1)}+1]$th column to the $[n*(k-1)+m_1+m_2+\ldots+m_{(x-1)}+m_x]$th column of the multiplexed ODUCn, wherein $m_1, m_2, m_3 \ldots m_{(r-1)}$ and $m_r$ are all positive integers; $m_1+m_2+m_3+\ldots+m_{(r-1)}+m_r=n$; $1 \le k \le 3824$; $x \le r$; x, r and k are all positive integers; when a value of m is 1, the ODUCm denotes ODU4; and $m_x \in \{m_1, m_2, m_3, \ldots, m_{(r-1)}, m_r\}$.

In accordance with yet another embodiment of the present disclosure, an optical signal receiving node for receiving the optical signal sent from the foregoing sending node is provided which includes: a first demultiplexing component configured to obtain the OPUCm by removing the ODU overhead from the received ODUCm, and demultiplex m OPUC from the OPUCm according to the way of byte interleave, wherein content of the byte area of the $[m*(k-1)+i]$th column in the OPUCm is used as content of the byte area of the kth column of the PS[i]th OPUC according to the values of the PSI[1], PSI[2] . . . PSI[m] formed by the content from the first column to the mth column in the fourth row of the received even-numbered OPUCm, wherein PSI[i] denotes that the sequence of interleaving the bytes of the PSI[i]th OPUC into the OPUCm is i; and a demapping component configured to sequentially demap the m demultiplexed OPUC into the one Ethernet service data stream the rate of which is m*100 Gb/s.

In accordance with yet another aspect of the present disclosure, an optical signal receiving node for receiving the optical signal sent by the sending node includes: a second demultiplexing component configured to obtain the r ODUCm$_x$ contained in one ODUCn received, wherein according to the way of byte interleave, content of the byte areas from the $[n*(k-1)+m_1+m_2+\ldots+m_{(x-1)}+1]$th column to the $[n*(k-1)+m_1+m_2+\ldots+m_{(x-1)}+m_x]$th column of the ODUCn sequentially is used as content of the byte areas from the $[[m_x*(k-1)+1]$th column to the $[m_x*(k-1)+m_x]$th column of the ODUCm$_x$.

In accordance with yet still another embodiment of the present disclosure, an optical signal transfer system is provided which includes the foregoing sending node and the foregoing receiving node.

By sequentially mapping an Ethernet service data stream a rate of which is m*100 Gb/s into m OPUC, and multiplexing the m OPUC into one OPUCm a rate of which is m*100 Gb/s according to a way of byte interleave and adding an ODU overhead to a head of the OPUCm to obtain an ODUCm a rate of which is m*100 Gb/s, the present disclosure addresses the problem of how to map and multiplex data effectively after a Flexible Grid technology is introduced into the related art, enables the operator to deploy a beyond-100G optical transfer system more flexibly and improves the spectral efficiency of optical fiber and the flexibility and the compatibility of a system.

BRIEF DESCRIPTION OF THE DRAWINGS

The accompanying drawings described herein are provided for a better understanding of the present disclosure and constitute one part of the present disclosure, and the exemplary embodiments of the present disclosure and description thereof are illustrative of the present disclosure but are not to be construed as limiting the present disclosure. In the accompanying drawings.

DETAILED DESCRIPTION OF THE EMBODIMENTS

The present disclosure is described below in detail with reference to accompanying drawings and in conjunction with embodiments. It should be noted that embodiments of the present disclosure and the features thereof can be combined with each other if no conflict is caused.

Figure 1:
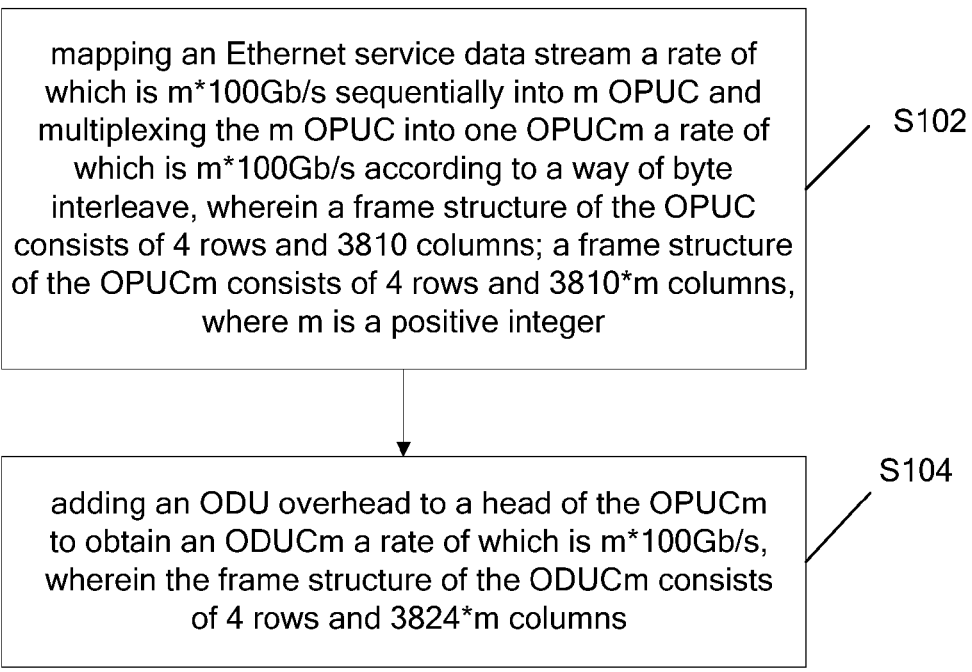
FIG. 1 is a flowchart showing a data mapping and multiplexing method according to an embodiment of the present disclosure.

A data mapping and multiplexing method is provided in an embodiment of the present disclosure. FIG. 1 is a flowchart showing a data mapping and multiplexing method according to an embodiment of the present disclosure, and as shown in FIG. 1, the method includes:

Step S102: mapping an Ethernet service data stream a rate of which is m*100 Gb/s sequentially into m OPUC and multiplexing the m OPUC into one OPUCm a rate of which is m*100 Gb/s according to a way of byte interleave, wherein a frame structure of the OPUC consists of 4 rows and 3810 columns; a frame structure of the OPUCm consists of 4 rows and 3810*m columns; and a frame structure of the ODUCm consists of 4 rows and 3824*m columns, where m is a positive integer.

Step S104: adding an ODU overhead to a head of the OPUCm to obtain an ODUCm a rate of which is m*100 Gb/s, wherein the frame structure of the ODUCm consists of 4 rows and 3824*m columns.

By executing the foregoing steps to map an Ethernet service data stream a rate of which is m*100 Gb/s sequentially into m OPUC and multiplexing the m OPUC into one OPUCm a rate of which is m*100 Gb/s according to a way of byte interleave and adding an ODU overhead to a head of the OPUCm to obtain an ODUCm a rate of which is m*100 Gb/s, the method addresses the problem of how to map and multiplex data effectively after a Flexible Grid technology is introduced into the related art, enables the operator to deploy a beyond-100G optical transfer system more flexibly and improves the spectral efficiency of optical fiber and the flexibility and the compatibility of a system.

In an example embodiment, in Step S102, multiplexing the m OPUC into the one OPUCm the rate of which is m*100 Gb/s according to the way of byte interleave includes: sequentially extracting the bytes of each column of the m OPUC, starting from bytes of the first column and ending with bytes of the last column, and sequentially combing groups of multiplexed bytes to obtain the OPUCm the rate of which is m*100 Gb/s, wherein each group of the groups of multiplexed bytes consists of bytes extracted from the same column of various frames of the m OPUC.

In an example embodiment, sequentially combing the groups of multiplexed bytes, wherein each group of the groups of multiplexed bytes consists of the bytes extracted from the same column of various frames of the m OPUC includes: using content of a byte area which is extracted from the kth column of the ith sub-frame of the m OPUC as t content of a byte area of the [m*(k−1)+$C_i$]th column of the multiplexed OPUCm the rate of which is m*100 Gb/s, where i and k are both integers; $1 \le i \le m$; $1 \le k \le 3810$; $C_i$ denotes a sequence of interleave bytes of the ith OPUC into the OPUCm, $C_i \in \{1, 2, 3, \ldots, m-1, m\}$, and a value of each $C_i$ is different.

In the implementation process of the method, m sequence values $C_i$ denoting the sequences of interleaving the bytes of various OPUC into the OPUCm are sequentially carried in byte areas form the first column to the mth column in the fourth row of overhead of each even-numbered OPUCm, and the content of the byte areas from the first column to the mth column in the fourth row of the overhead of the OPUCm forms a PSI which denotes the sequences of interleaving the bytes of various OPUC into the OPUCm. The method is beneficial to demapping and demultiplexing and improves the signal reception accuracy of a receiving node.

In an example embodiment, after Step S104 is executed, a plurality of the ODUCm may be multiplexed into one ODUCn according to the way of byte interleave, wherein a rate of the ODUCn is a sum of the rates of the plurality of the ODUCm and marked as n*100 Gb/s, where n is a positive integer; m is equal to or smaller than n; and an OTU overhead may be added to a head of the ODUCn to obtain an OTUCn.

In the implementation process of the method, multiplexing the plurality of ODUCm into the one ODUCn according to the way of byte interleave may include: sequentially adding r ODUCm, the rates of which are $m_1$*100 Gb/s, $m_2$*100 Gb/s, $m_3$100 Gb/s ... $m_{(r-1)}$*100 Gb/s and $m_r$*100 Gb/s respectively, into the one ODUCn according to the way of byte interleave, wherein content of byte areas from the $[[m_{x*(k}-1)]$th column to the $[m_x$*(k-1)+$m_x]$th column of an ODUCm$_x$ is used as content of byte areas from the [n*(k-1)+$m_1$+$m_2$+ ... +$m_{(x-1)}$+1]th column to the [n*(k-1)+$m_1$+$m_2$+ ... +$m_{(x-1)}$+$m_x$]th column of the multiplexed ODUCn, where $m_1$, $m_2$, $m_3$ ... $m_{(r-1)}$ and $m_r$ are all positive integers; $m_1$+$m_2$+$m_3$+ ... +$m_{(r-1)}$+$m_r$=n; 1≤k≤3824; x≤r; x, r and k are all positive integers; when a value of m is 1, the ODUCm denotes ODU4; and $m_x \in \{m_1, m_2, m_3, \ldots, m_{(r-1)}, m_r\}$.

Figure 2:
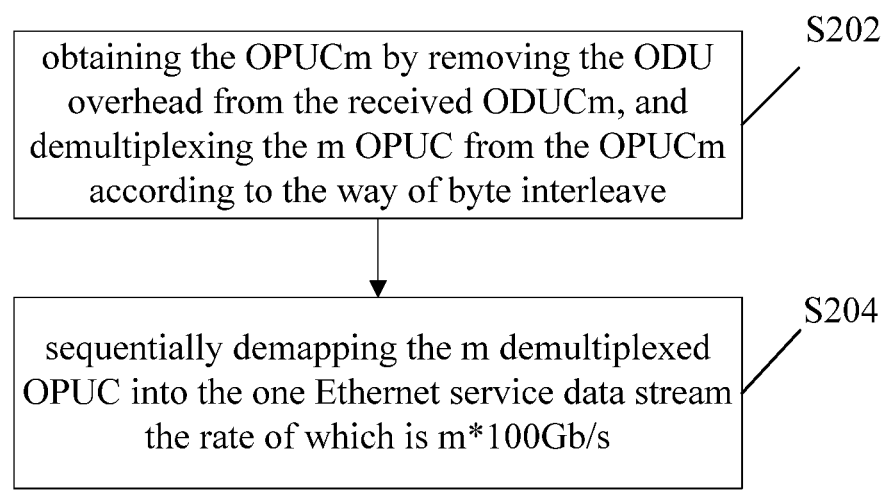
FIG. 2 is a flowchart showing a data demapping and demultiplexing method according to an embodiment of the present disclosure.

A method for demapping and demultiplexing the data mapped and multiplexed by the foregoing mapping and multiplexing method is provided in an embodiment of the present disclosure. FIG. 2 is a flowchart showing a data demapping and demultiplexing method according to an embodiment of the present disclosure, and as shown in FIG. 2, the method includes:

Step S202: obtaining the OPUCm by removing the ODU overhead from the received ODUCm, and demultiplexing the m OPUC from the OPUCm according to the way of byte interleave, wherein content of the byte area of the [m*(k-1)+i]th column in the OPUCm is used as content of the byte area of the kth column of the PS[i]th OPUC according to values of PSI[1], PSI[2] ... PSI[m] formed by content from the first column to the mth column in the fourth row of the received even-numbered OPUCm, wherein PSI[i] denotes that the sequence of interleaving the bytes of the PSI[i]th OPUC into the OPUCm is i Step S204: sequentially demapping the m demultiplexed OPUC into the one Ethernet service data stream the rate of which is m*100 Gb/s.

In accordance with still another embodiment of the present disclosure, a method for demultiplexing and demapping the data mapped and multiplexed by the foregoing mapping and multiplexing method is provided which includes: obtaining the r ODUCm$_x$ contained in one ODUCn received, wherein according to the way of byte interleave, content of the byte areas from the [n*(k-1)+$m_1$+$m_2$+ ... +$m_{(x-1)}$+1]th column to the [n*(k-1)+$m_1$+$m_2$+ ... +$m_{(x-1)}$+$m_x$]th column of the ODUCn sequentially is used as content of the byte areas from the $[[m_x$*(k-1)+1]th column to the $[m_x$*(k-1)+$m_x$]th column of the ODUCm$_x$.

Figure 3:
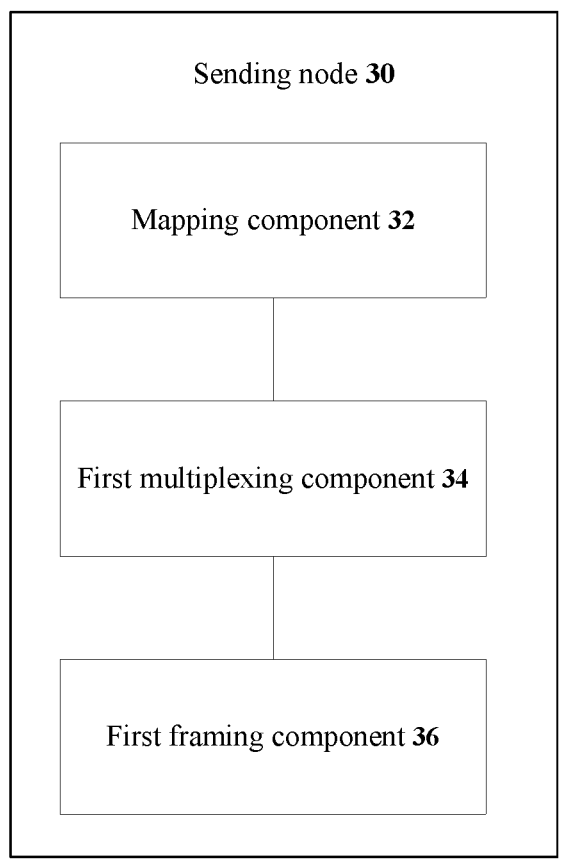
FIG. 3 is a block diagram showing the structure of an optical signal sending node according to an embodiment of the present disclosure.

An optical signal sending node is provided in an embodiment of the present disclosure. FIG. 3 is a block diagram showing the structure of an optical signal sending node according to an embodiment of the present disclosure, and as shown in FIG. 3, the sending node 30 includes: a mapping component 32 configured to map an Ethernet service data stream a rate of which is m*100 Gb/s sequentially into m OPUC, wherein a frame structure of the OPUC consists of 4 rows and 3810 columns, where m is a positive integer; a first multiplexing component 34 coupled with the mapping component 32 and configured to multiplex the m OPUC into one OPUCm a rate of which is m*100 Gb/s according to a way of byte interleave, wherein the frame structure of the ODUCm consists of 4 rows and 3810*m columns; and a first framing component 36 coupled with the first multiplexing component 34 and configured to add an ODU overhead to the head of the OPUCm to obtain an ODUCm the rate of which is m*100 Gb/s, wherein the frame structure of the OPUCm consists of 4 rows and 3824*m columns.

As the mapping component 32 maps an Ethernet service data stream a rate of which is m*100 Gb/s sequentially into m OPUC; the first multiplexing component 34 multiplexes the m OPUC into one OPUCm a rate of which is m*100 Gb/s according to a way of byte interleave; and the first framing component 36 adds an ODU overhead to a head of the OPUCm to obtain an ODUCm a rate of which is m*100 Gb/s, and the sending node 30 addresses the problem of how to map and multiplex data effectively after a Flexible Grid technology is introduced into the related art, enables the operator to deploy a beyond-100G optical transfer system more flexibly and improves the spectral efficiency of optical fiber and the flexibility and the compatibility of a system.

Figure 4:
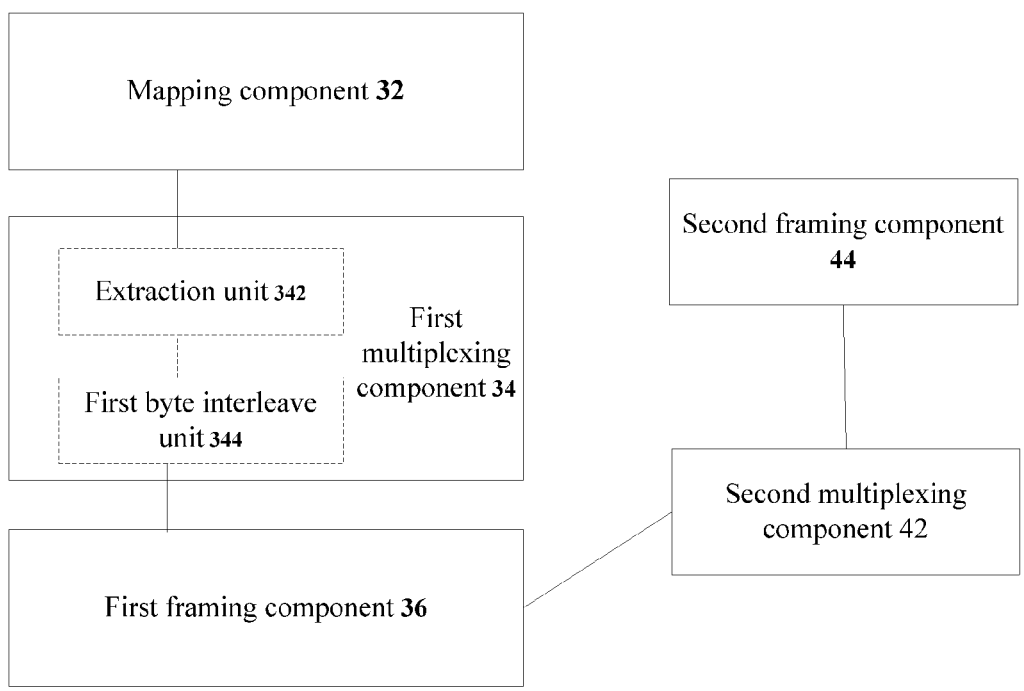
FIG. 4 is a block diagram showing the structure of an optical signal sending node according to an example embodiment of the present disclosure.

FIG. 4 is a block diagram showing the structure of an optical signal sending node according to an example embodiment of the present disclosure, and as shown in FIG. 4, the first multiplexing component 34 further includes: an extraction unit 342 configured to sequentially extract bytes of each column of the m OPUC, starting from bytes of the first column and ending with bytes of the last column; and a first byte interleave unit 344 coupled with the extraction unit 342 and configured to sequentially combine groups of multiplexed bytes to obtain the OPUCm the rate of which is m*100 Gb/s, wherein each group of the groups of multiplexed bytes consists of bytes extracted from the same column of various frames of the m OPUC.

In an example embodiment, the first byte interleave unit 344 is further configured to use content of a byte area which is extracted from the kth column of the ith sub-frame of the m OPUC as content of a byte area of the [m*(k-1)+$C_i$]th column of the multiplexed OPUCm the rate of which is m*100 Gb/s, wherein i and k are both integers; 1≤i≤m; 1≤k≤3810; $C_i$ denotes a sequence of interleave bytes of the ith OPUC into the OPUCm, $C_i \in \{1, 2, 3, \ldots, m-1, m\}$, and a value of each $C_i$ is different.

In an example embodiment, the first byte interleave unit 344 is further configured to sequentially carry, in byte areas from the first column to the mth column in the fourth row of overhead of each even-numbered OPUCm, m sequence values $C_i$ denoting the sequences of interleaving the bytes of various OPUC into the OPUCm, wherein content of the byte areas from the first column to the mth column in the fourth row of the overhead of the OPUCm forms a PSI which denotes the sequences of interleaving the bytes of various OPUC into the OPUCm.

In an example embodiment, the optical signal sending node 30 further includes: a second multiplexing unit 42 coupled with the first framing component 36 and configured to multiplex a plurality of the ODUCm into one ODUCn according to the way of byte interleave, wherein a rate of the ODUCn is a sum of rates of the plurality of the ODUCm and marked as n*100 Gb/s; where n is a positive integer, and m<=n; and a second framing component 44 coupled with the second multiplexing component 42 and configured to add an OTU overhead to a head of the ODUCn to obtain an OTUCn.

In an example embodiment, the second multiplexing component 42 is further configured to sequentially add r ODUCm, the rates of which are $m_1$*100 Gb/s, $m_2$*100 Gb/S, $m_3$*100 Gb/s ... $m_{(r-1)}$*100 Gb/s and $m_r$*100 Gb/s respectively, into the one ODUCn according to the way of byte interleave, wherein the content of byte areas from the $[[m_x*(k-1)]$th column to the $[m_x*(k-1)+m_x]$th column of an ODUCm$_x$ is used as content of byte areas from the $[n*(k-1)+m_1+m_2+ \ldots +m_{(x-1)}+1]$th column to the $[n*(k-1)+m_1+m_2+ \ldots m_{(x-1)}+m_x]$th column of the multiplexed ODUCn, wherein $m_1$, $m_2$, $m_3$ ... $m_{(r-1)}$ and $m_r$ are all positive integers; $m_1+m_2+m_3+ \ldots +m_{(r-1)}+m_r=n$; $1 \le k \le 3824$; $x \le r$; x, r and k are all positive integers; when a value of m is 1, the ODUCm denotes ODU4; and $m_x \in \{m_1, m_2, m_3, \ldots, m_{(r-1)}, m_r\}$.

Figure 5:
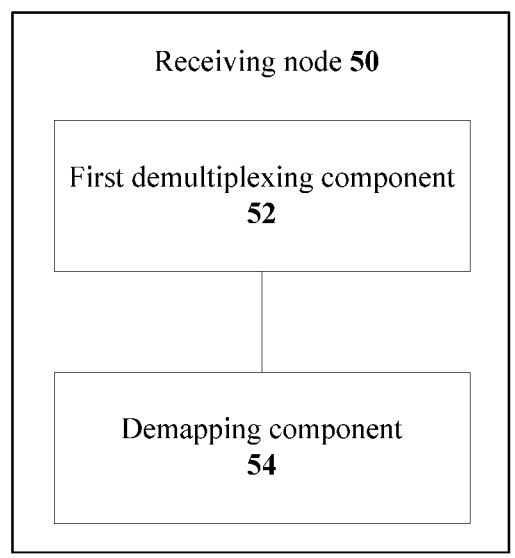
FIG. 5 is a block diagram showing the structure of an optical signal receiving node according to an embodiment of the present disclosure.

An optical signal receiving node 50 for receiving the optical signal sent by the foregoing sending node 30 is provided in an embodiment of the present disclosure. FIG. 5 is a block diagram showing the structure of an optical signal receiving node according to an embodiment of the present disclosure, and as shown in FIG. 5, the receiving node 50 includes: a first demultiplexing component 52 configured to obtain the OPUCm by removing the ODU overhead from the received ODUCm, and demultiplex the m OPUC from the OPUCm according to the way of byte interleave, wherein content of the byte area of the $[m*(k-1)+i]$th column in the OPUCm is used as content of the byte area of the kth column of the PS[i]th OPUC according to the values of PSI[1], PSI[2] ... PSI[m] formed by content from the first column to the mth column in the fourth row of the received even-numbered OPUCm, wherein PSI[i] denotes that the sequence of interleaving the bytes of the PSI[i]th OPUC into the OPUCm is i; and a demapping component 54 coupled with the demultiplexing component 52 and configured to sequentially demap the m demultiplexed OPUC into the one Ethernet service data stream the rate of which is m*100 Gb/s.

Figure 6:
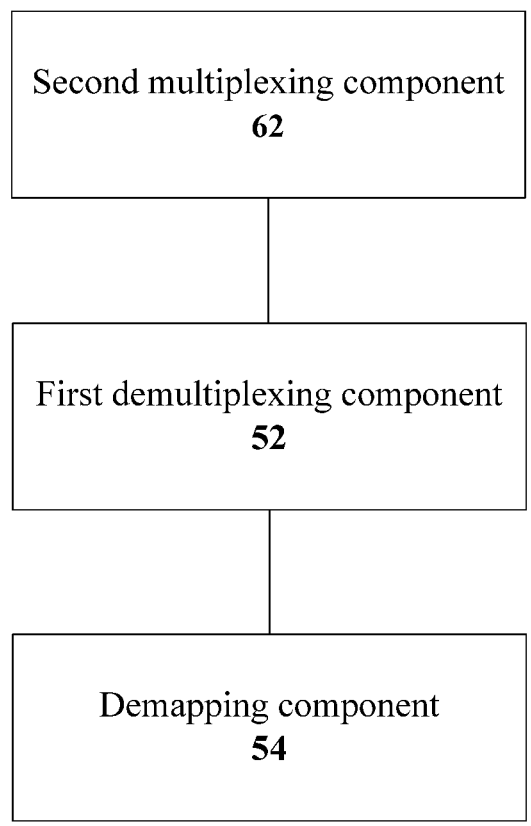
FIG. 6 is a block diagram showing the structure of an optical signal receiving node according to an example embodiment of the present disclosure.

An optical signal receiving node 50 for receiving the optical signal sent by the foregoing sending node 30 is provided in an embodiment of the present disclosure. FIG. 6 is a block diagram showing the structure of an optical signal receiving node according to an example embodiment of the present disclosure, and as shown in FIG. 6, the receiving node 50 includes: a second demultiplexing component 62 configured to obtain the r ODUCm$_x$ contained in one ODUCn received, wherein according to the way of byte interleave, content of the byte areas from the $[n*(k-1)+m_1+m_2+ \ldots +m_{(x-1)}+1]$th column to the $[n*(k-1)+m_1+m_2+ \ldots +m_{(x-1)}+m_x]$th column of the ODUCn sequentially is used as content of the byte areas from the $[[m_x*(k-1)+1]$th column to the $[m_x*(k-1)+m_x]$th column of the ODUCm$_x$.

Figure 7:
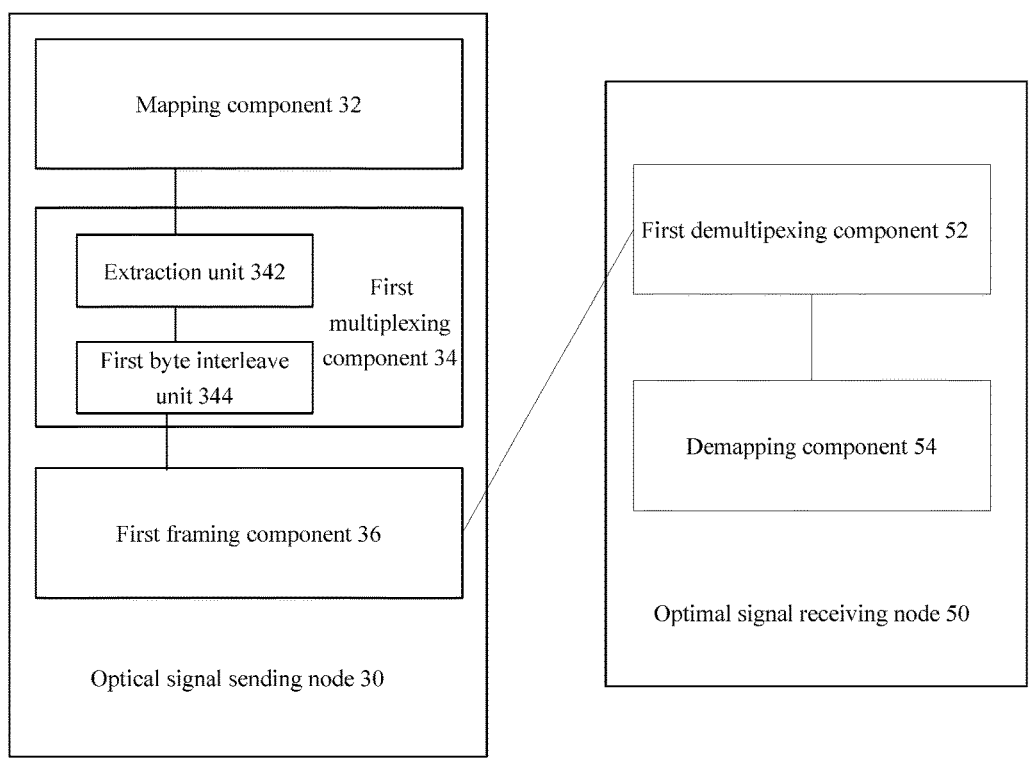
FIG. 7 is a block diagram showing the structure of an optical signal transfer system according to an embodiment of the present disclosure.
Figure 8:
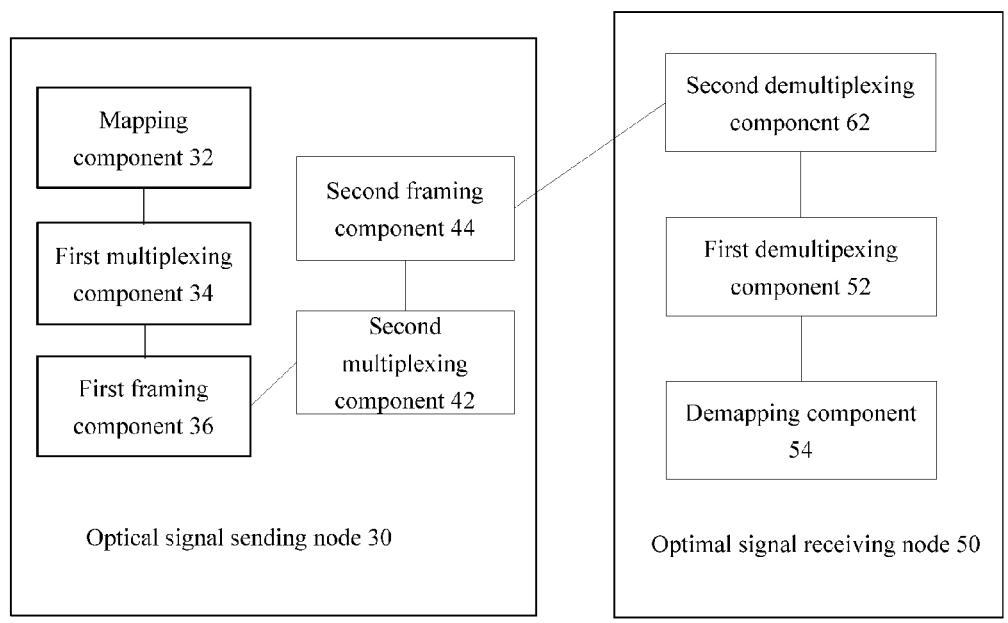
FIG. 8 is a block diagram showing the structure of an optical signal transfer system according to an example embodiment of the present disclosure.

An optical signal transfer system is further provided in an embodiment of the present disclosure. FIG. 7 is a block diagram showing the structure of an optical signal transfer system according to an embodiment of the present disclosure, FIG. 8 is a block diagram showing the structure of an optical signal transfer system according to an example embodiment of the present disclosure, and as shown in FIG. 7 and FIG. 8, the system includes the foregoing sending node 30 and the foregoing receiving node 50.

The implementation of the foregoing embodiments is described below in detail in conjunction with example embodiments and accompanying drawings.

Embodiment 1

A data mapping and multiplexing method is provided in the present disclosure to at least address the problem of how to effectively map and multiplex data after a Flexible Grid technology is introduced into the related art.

Figure 9:
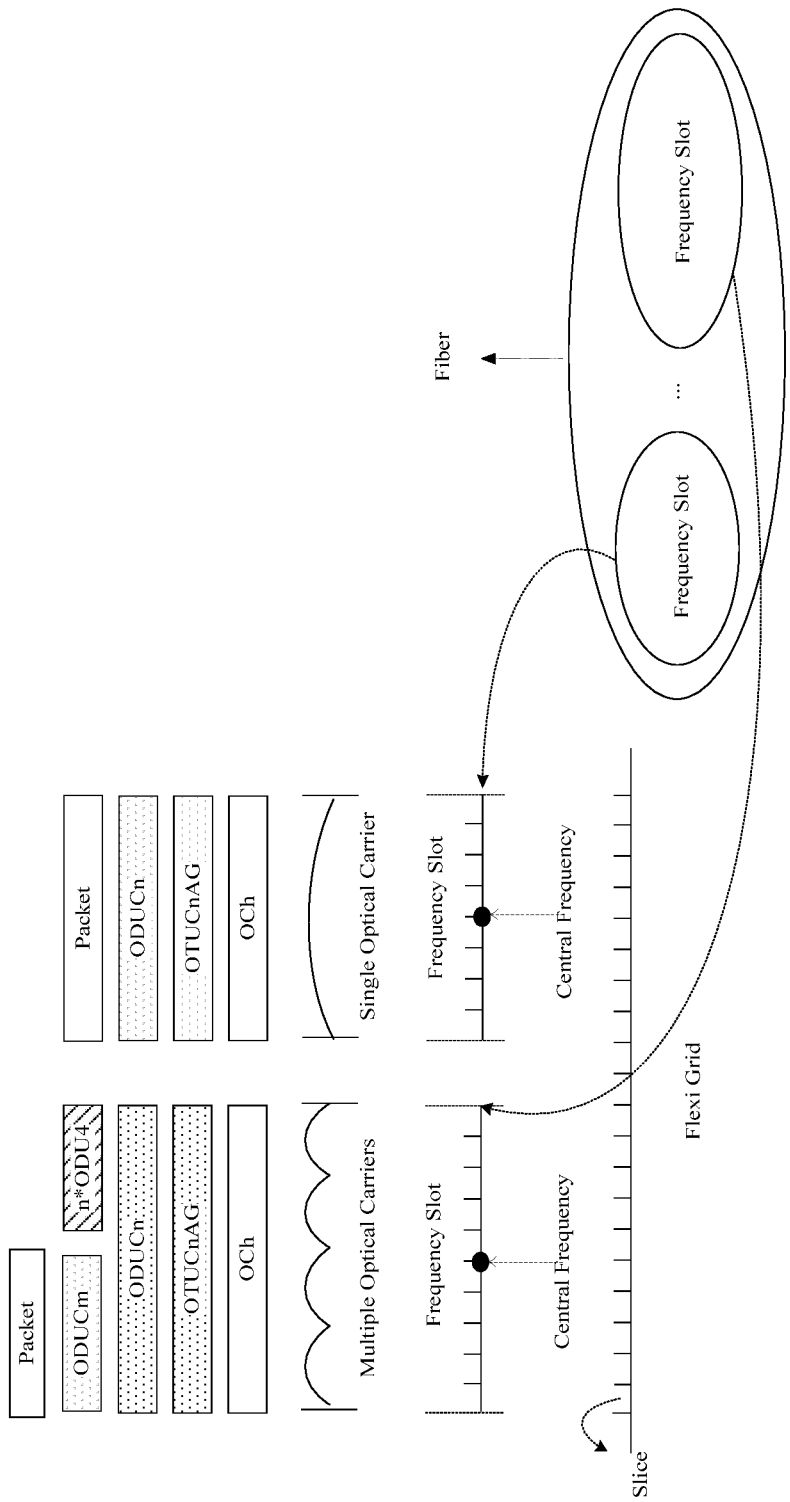
FIG. 9 is a schematic diagram showing an ODUCn-OTUCnAG-OCh mapping and multiplexing flow according to embodiment 1 of the present disclosure.

FIG. 9 is a schematic diagram showing an ODUCn-OTUCnAG-OCh mapping and multiplexing flow according to embodiment 1 of the present disclosure, and as shown in FIG. 9, packet service data is mapped into an ODUCn, representing a rate higher than ODUk (k=0, 1, 2, 2e, 3, 4)), and the ODUCn is mapped into an OTU High-speed Administrative Group (OTUCnAG); the OTUCnAG is mapped into an Optical Channel (OCh), wherein rates of the ODUCn, the OTUCnAG and the OCh are all N times of 100 Gb/s, and the tributary slot size of the ODUCn is 100 Gb/s, where N is a positive integer equal to or greater than 2.

It should be noted that the OTUCnAG is an OTU high-speed administrative group which is an N*100 Gb/s composite signal consisting of N 100G OTU frames. For example, an OTUC2AG represents 200 Gb/s; an OTUC4AG represents 400 Gb/s; and the OChAG represents an signal set of optical channel for bearing the OTUCnAG, if optical signals pass the same route, the OChAG provides individual entities to manage the signals; if the signals pass different routes, then a plurality of OCh are needed, and the signals passing the same route are managed by the same optical channel.

In an example embodiment, an ODU4 bearing a lower-order ODUk or packet service data and a lower-order ODUCm (m<n) bearing packet service data are jointly multiplexed into a high-order ODUCn, wherein the ODUk at least includes one of: ODU0, ODU1, ODU2, ODU2e, ODU3 and ODUflex; and then the high-order ODUCn is mapped into the OTUCnAG.

Figure 10:
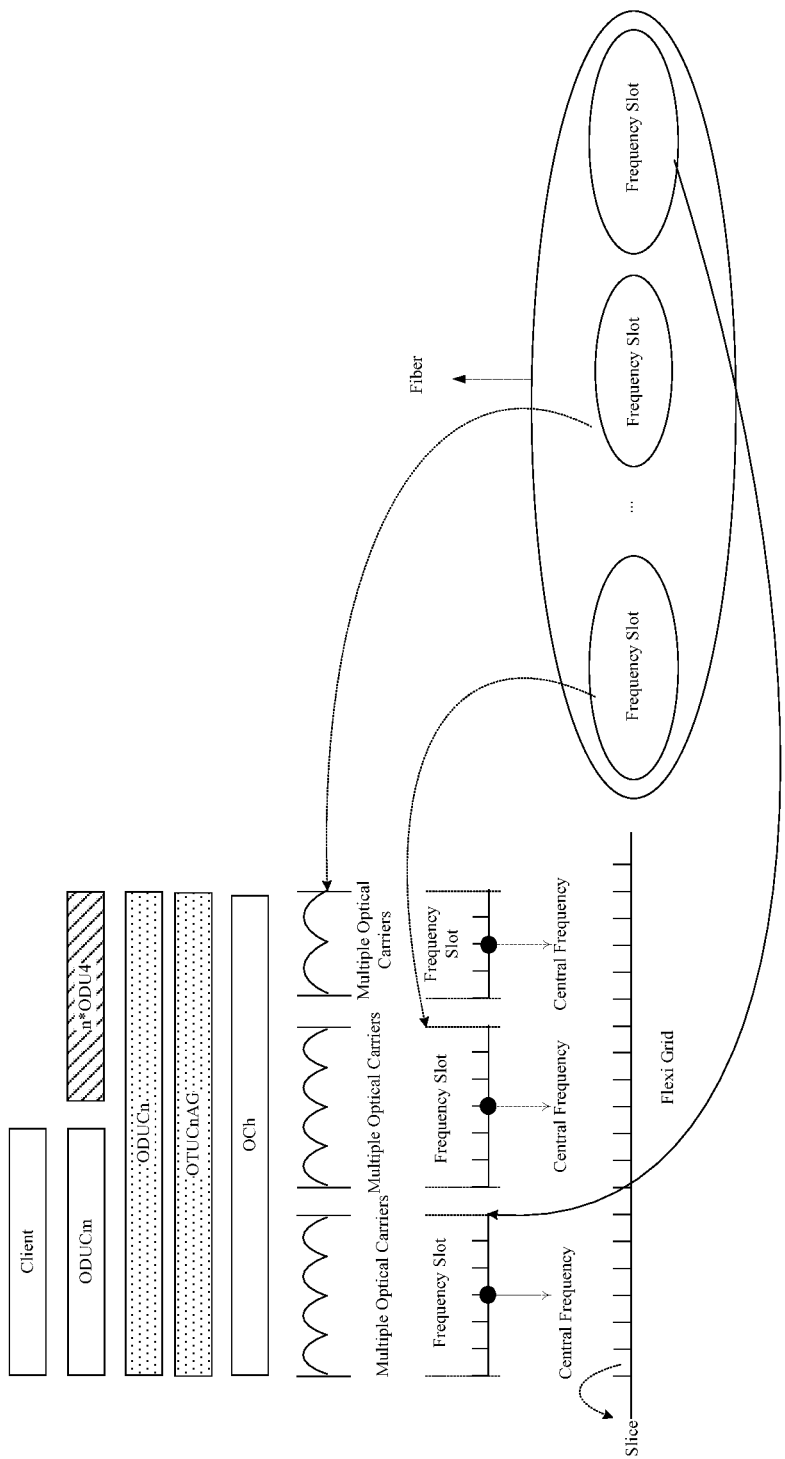
FIG. 10 is a schematic diagram showing another ODUCn-OTUCnAG-OCh mapping and multiplexing flow according to embodiment 1 of the present disclosure.

FIG. 10 is a schematic diagram showing another ODUCn-OTUCnAG-OCh mapping and multiplexing flow according to embodiment 1 of the present disclosure, wherein the plurality of optical signals contained in an OCh are born by discrete spectrums and pass the same route. As shown in FIG. 10, an ODUCn is mapped into an OTUCnAG passing a single OCh, and the optical signals in the OCh pass the same route and occupy discrete spectrums. The signals are managed by a single OCh entity.

Figure 11:
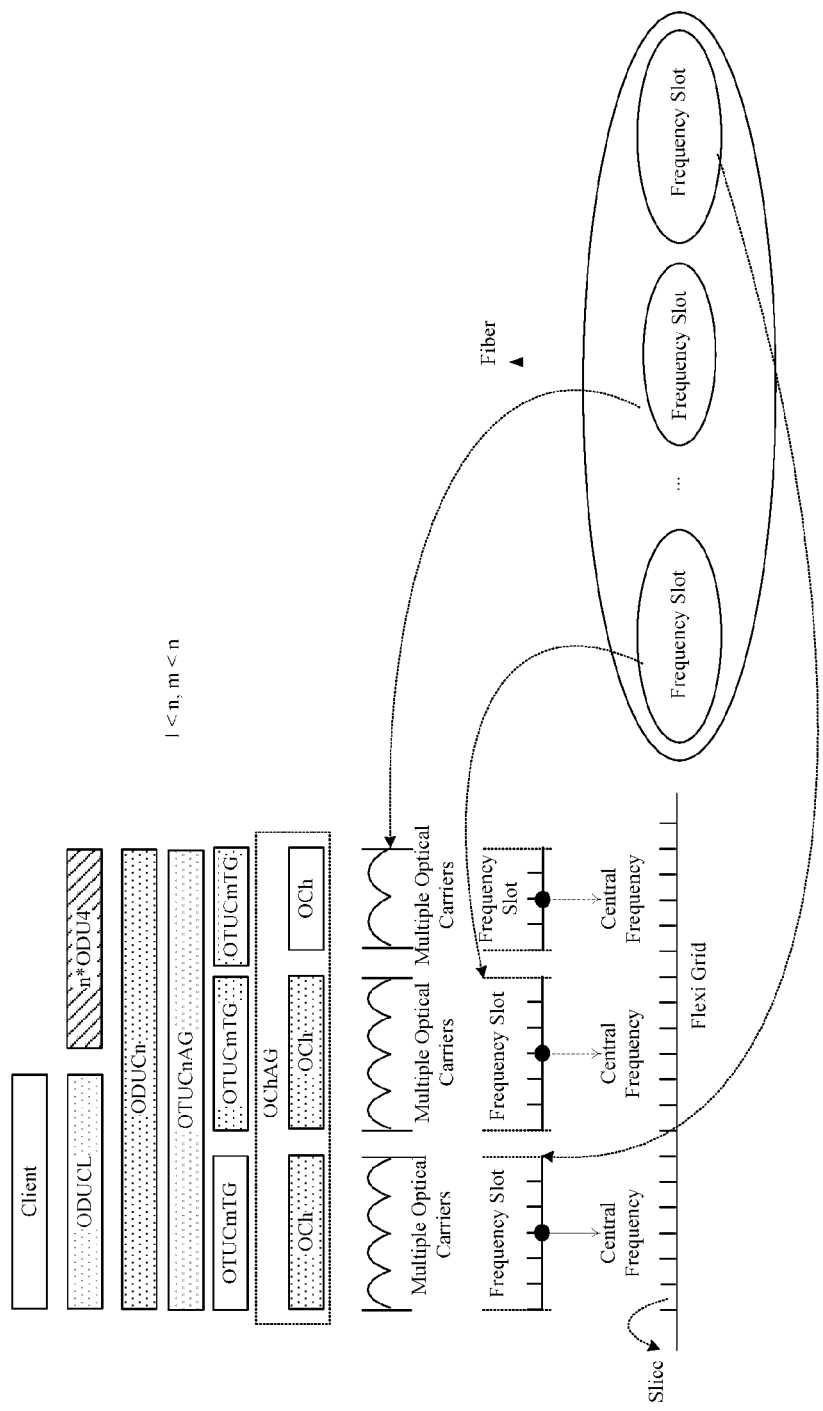
FIG. 11 is a schematic diagram showing an ODUCn-OTUCnAG-z*OTUCmTG-OChAG mapping and multiplexing flow according to embodiment 1 of the present disclosure.

FIG. 11 is a schematic diagram showing an ODUCn-OTUCnAG-z*OTUCmTG-OChAG according to embodiment 1 of the present disclosure, wherein the plurality of optical signals contained in an OChAG are born by discrete spectrums and pass different routes. As shown in FIG. 11, the process of mapping an ODUCn into an OTUCnAG and then mapping the OTUCnAG into an OChAG includes: inversely multiplexing the OTUCnAG into a plurality of optical channel transfers units (OTUCmTG) and then mapping the OTUCmTG into a corresponding OCh, wherein the rate of the OTUCmTG is M times of 100 Gb/s, M is equal to or greater than 1 but smaller than N. The OTUCmTG (Transport Group, m<n) is a composite signal the rate of which is m*100 Gb/s. Each OTUCmTG has the same rate level, or all OTUCmTG have different rate levels.

Figure 12:
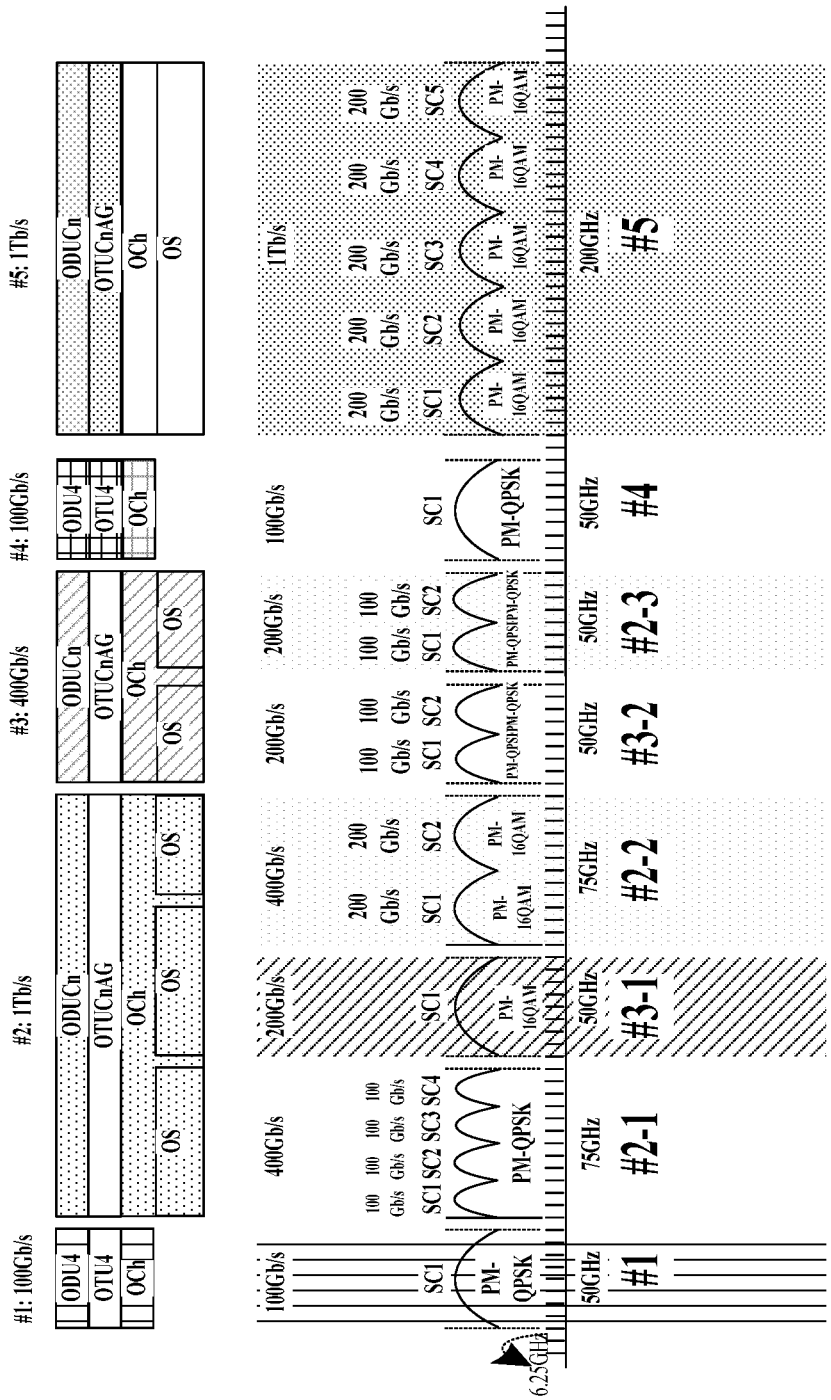
FIG. 12 is a schematic diagram showing the mapping, multiplexing and optical signal transfer processing flow of five signals on the same optical fiber according to embodiment 1 of the present disclosure.

FIG. 12 is a schematic diagram showing the mapping, multiplexing and optical signal transfer processing flow of five signals on the same optical fiber according to an embodiment 1 of the present disclosure. As shown in FIG. 12, five services are totally transmitted on an optical fiber; #1 and #4 are respectively 100 Gb/s signals which respectively occupy a 50 GHz spectrum resource and are respectively transmitted by a single carrier using a Polarization-multiplexed Quadrature Phase Shift Keying (PM-QPSK) modulation scheme.

2 is a 1 Tbit/s (1 Tb/s) signal, and the payload of the OCh signal is supported by three optical signals (OS); each of the three OS corresponds to one media channel, wherein the bit rates of two media channels #2-1 and #2-2 corresponding to two optical signals are respectively 400 Gb/s. The media channel #2-1 is transmitted by four sub-carriers (SC) SC1, SC2, SC3 and SC4 using a PM-QPSK modulation scheme, and the four sub-carriers, the bit rates of which are respectively 100 Gb/s, totally occupy a 75 GHz spectrum resource. The media channel #2-2 is transmitted by two sub-carriers SC1 and SC2 using a PM-16QAM modulation scheme, and the two sub-carriers, the bit rates of which are respectively 200 Gb/s, totally occupy a 75 GHz spectrum resource. The bit rate of media channel #2-3 corresponding to the last one optical signal is 200 Gb/s. The media channel #2-3 is transmitted by two sub-carriers SC1 and SC2 using a PM-QPSK modulation scheme, and the two sub-carriers, the bit rates of which are respectively 100 Gb/s, totally occupy a 50 GHz spectrum resource.

3 is a 400 Gbit/s (400 Gb/s) signal, and the payload of the OCh signal is supported by two optical signals, and each of optical signals corresponds to one media channel. The bit rates of the two media channels corresponding to the two optical signals #3-1 and #3-2 are respectively 200 Gb/s. The media channel #3-1 is transmitted by a single sub-carrier SC1 using a PM-16QAM modulation scheme and occupying a 50 GHz spectrum resource. The media channel #3-2 is transmitted by two sub-carriers SC1 and SC2 using a PM-QPSK modulation scheme, and the two sub-carries, the bit rates of which are respectively 100 Gb/s, totally occupy a 50 GHz spectrum resource.

5 is a 1 Tbit/s (1 Tb/s) signal, and the payload of the OCh signal is supported by one optical signal which corresponds to one media channel transmitted by five sub-carriers SC1, SC2, SC3, SC4 and SC5 using a PM-16QAM modulation scheme, and the five sub-carriers, the bit rates of the which are respectively 200 Gb/s, totally occupy a 200 GHz spectrum resource.

Figure 13:
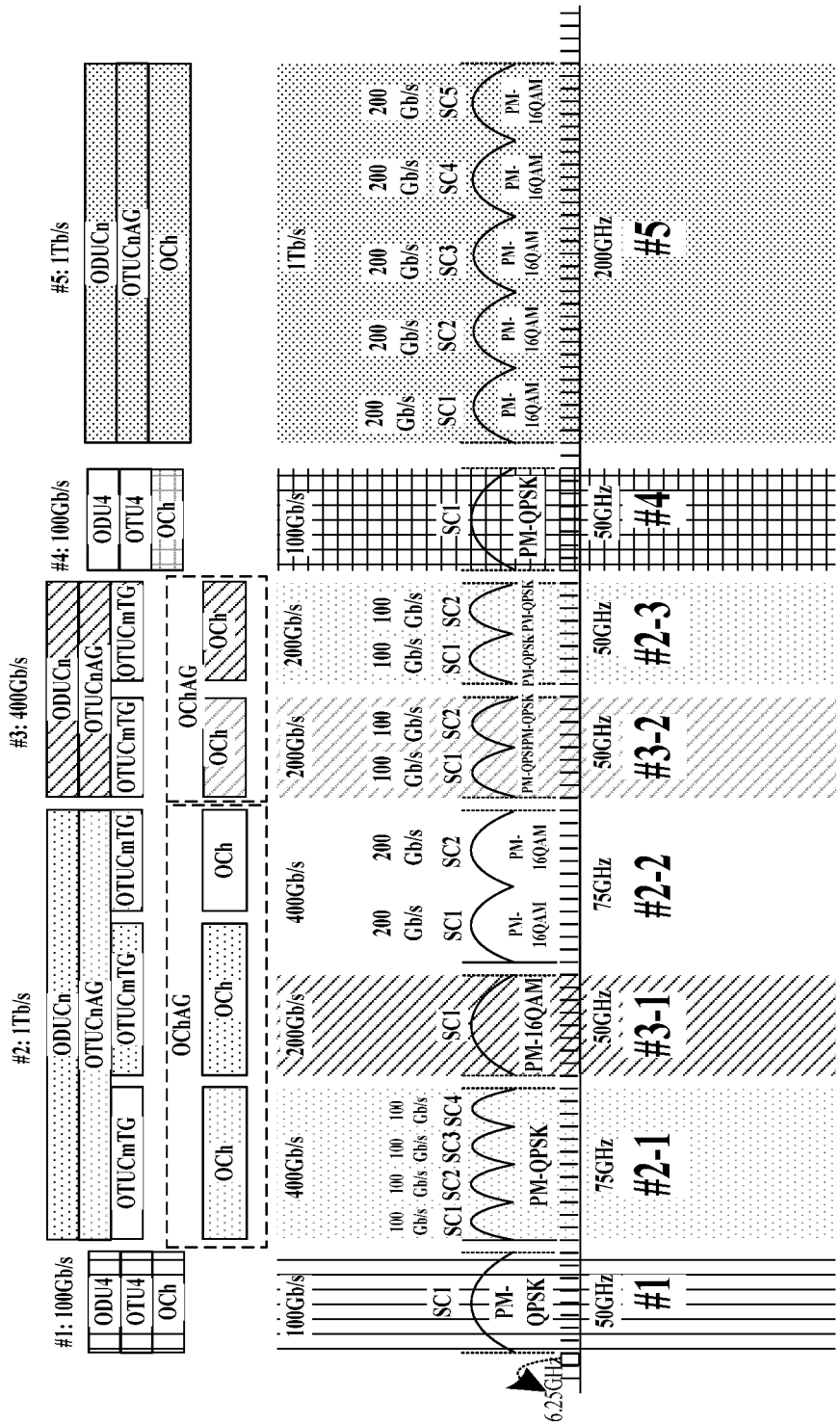
FIG. 13 is a schematic diagram showing another mapping, multiplexing and optical signal transfer processing flow of five signals on the same optical fiber according to embodiment 1 of the present disclosure.

FIG. 13 is a schematic diagram showing the mapping, multiplexing and optical signal transfer processing flow of five signals on the same optical fiber according to an embodiment 1 of the present disclosure. As shown in FIG. 13, five services are transmitted on an optical fiber; #1 and #4 are respectively 100 Gb/s signals which respectively occupy a 50 GHz spectrum resource and which are respectively transmitted by a single carrier using a Polarization-multiplexed Quadrature Phase Shift Keying (PM-QPSK) modulation scheme.

2 is a 1 Tbit/s signal, and the OTUCnAG signal is supported by three Och, each of the three Och corresponds to one media channel, wherein the bit rates of two media channels #2-1 and #2-2 corresponding to two Och are respectively 400 Gb/s. The media channel #2-1 is transmitted by four sub-carriers SC1, SC2, SC3 and SC4 using a PM-QPSK modulation scheme, and the four sub-carriers, the bit rates of which are respectively 100 Gb/s, totally occupy a 75 GHz spectrum resource. The media channel #2-2 is transmitted by two sub-carriers SC1 and SC2 using a PM-16QAM modulation scheme, and the two sub-carriers, the bit rates of which are respectively 200 Gb/s, totally occupy a 75 GHz spectrum resource. The bit rate of media channel #2-3 corresponding to the last one OCh is 200 Gb/s. The media channel #2-3 is transmitted by two sub-carriers SC1 and SC2 using a PM-QPSK modulation scheme, and the two sub-carriers, the bit rates of which are respectively 100 Gb/s, totally occupy a 50 GHz spectrum resource.

3 is a 400 Gb/s signal, and the payload of the OTUCnAG signal is supported by two OCh, and each of OCh-P corresponds to one media channel. The bit rates of the two media channels corresponding to #3-1 and #3-2 are respectively 200 Gb/s. The media channel #3-1 is transmitted by a single sub-carrier SC1 using a PM-16QAM modulation scheme and occupying a 50 GHz spectrum resource. The media channel #3-2 is transmitted by two sub-carriers SC1 and SC2 using a PM-QPSK modulation scheme, and the sub-carriers, the bit rates of which are respectively 100 Gb/s, totally occupy a 50 GHz spectrum resource.

5 is a 1 Tbit/s (1 Tb/s) signal, the payload of the OTUCnAG signal is supported by one OCh which corresponds to one media channel which is transmitted by five sub-carriers SC1, SC2, SC3, SC4 and SC5 using a PM-16QAM modulation scheme, and the sub-carriers SC1, SC2, SC3, SC4 and SC5, the bit rates of which are respectively 200 Gb/s, totally occupy a 200 GHz spectrum resource.

Embodiment 2

Figure 14:
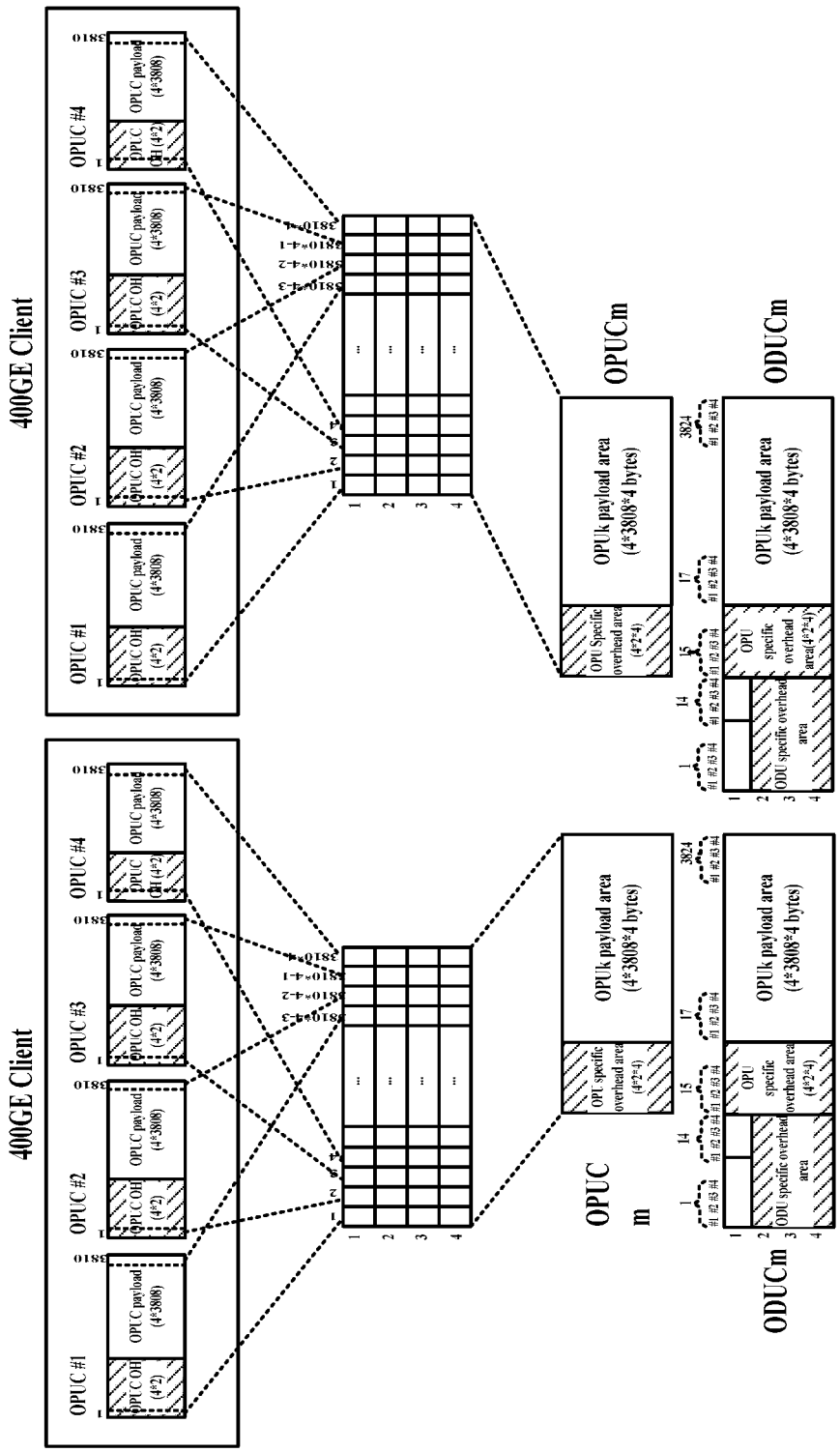
FIG. 14 is a schematic diagram showing a processing method of mapping and multiplexing data into an ODUCm according to embodiment 2 of the present disclosure.

FIG. 14 is a schematic diagram showing a processing method of mapping and multiplexing data into an ODUCm according to embodiment 2 of the present disclosure, and as shown in FIG. 14, a universal data mapping and multiplexing method is provided in the embodiment, for the sake of convenient description, the frame structure (4*3810) of an Optical Payload Unit (OPU) defined by protocol G.709 is herein referred to as an OPUC the maximum rate of which is 100 Gb/s. That is, one client service data stream the rate of which is m*100G, for example, an 400 GE Ethernet service data stream, where m is 4, or a 1TE Ethernet data stream, where m is 10, is mapped into an OPUCm. It should be noted that the ODUCm frame generated in the embodiment can be used as an input, but not a unique input, in embodiment 3 in which an ODUCm is merely decoupled from an ODUCn. An example of mapping 400GE into an OPUCm (m=4) is given below.

For example, the following cyclic operation is still executed for a client service data stream the rate of which is m*100G at a data sending terminal until there is no date to be sent. j is initialized to be 1, x++ or j++ denotes that x or j is progressively increased by 1 after each cycle, and the processing flow is described below in C/C++ language.

If (there is data needing sending)
{
for (x=1, x++, x<=m)
{
The first 4*3808 bytes are taken out from a m*100G data stream as the OPU payload content in an OPUC #x frame and added with an OPU overhead to form one integral OPUC #x frame which totally includes 4*3810 bytes, where #x denotes the number of the OPUC frame.

Note: the taking out of 4*3808 bytes in each cycle is logically equivalent to the disappearance of these bytes in the m*100G data stream, therefore, these bytes are not processed further, and the next 4*3808 bytes are taken as the payload content of an OPUC#(x+1).
}
m OPUC frames which are specifically frames OPUC #1, OPUC #2, . . . OPUC#(m−1) and OPUC #m are formed through the foregoing cyclic process. The following processing flow is implemented according to a byte interleave sequence configured by a management or control platform. $C_i$ denotes that each column of an OPUC #i is added into the OPUCm as a way of byte interleave according to the sequence denoted by the value of $C_i$, where $C_i \in [1, m]$. For example, if m is 4, then $C_i \in \{1, 2, 3, 4\}$, that is, $C_i$ may be any one of $\{1, 2, 3, 4\}$. For example, $C_1=2$, $C_2=3$, $C_3=1$, $C_4=4$, wherein $C_1$, $C_2$, $C_3$ and $C_4$ must be all different, that is, the content of the byte area of the first columns in the four rows of the OPUC#1 (totally four bytes) is used as the content of the byte area of the second ($C_1$) columns in the four rows of the OPUCm; the content of the byte area of the first columns in the four rows of the OPUC#2 (totally four bytes) is used as the content of the byte area of the third ($C_2$) columns in the four rows of the OPUCm; the content of the byte area of the first columns in the four rows of the OPUC#3 (totally four bytes) is used as the content of the byte area of the first ($C_3$) columns in the four rows of the OPUCm; and the content of the byte area of the first columns in the four rows of the OPUC#4 (totally four bytes) is used as the content of the byte area of the fourth ($C_4$) columns in the four rows of the OPUCm;

the content of the byte area of the second columns in the four rows of the OPUC#1 (totally four bytes) is used as the content of the byte area of the sixth columns (m+$C_1$, wherein m=4, $C_1$=2) in the four rows of the OPUCm; the content of the byte area of the second columns in the four rows of the OPUC#2 (totally four bytes) is used as the content of the byte area of the seventh columns (m+$C_2$, wherein m=4, $C_1$=3) in the four rows of the OPUCm; the content of the byte area of the second columns in the four rows of the OPUC#3 (totally four bytes) is used as the content of the byte area of the fifth columns (m+$C_3$, wherein m=4, $C_1$=1) in the four rows of the OPUCm; and the content of the byte area of the second columns in the four rows of the OPUC#4 (totally four bytes) is used as the content of the byte area of the eighth columns (m+$C_4$, wherein m=4, $C_1$=4) in the four rows of the OPUCm; the content of the byte area of the third columns in the four rows of the OPUC#1 (totally four bytes) is used as the content of the byte area of the tenth columns (2m+$C_1$, wherein m=4, $C_1$=2) in the four rows of the OPUCm; the content of the byte area of the third columns in the four rows of the OPUC#2 (totally four bytes) is used as the content of the byte area of the eleventh columns (2m+$C_2$, wherein m=4, $C_1$=3) in the four rows of the OPUCm; the content of the byte area of the third columns in the four rows of the OPUC#3 (totally four bytes) is used as the content of the byte area of ninth columns (2m+$C_3$, wherein m=4, $C_1$=1) in the four rows of the OPUCm; and the content of the byte area of the third columns in the four rows of the OPUC#4 (totally four bytes) is used as the content of the byte area of the twelfth columns (2m+$C_4$, wherein m=4, $C_1$=4) in the four rows of the OPUCm.

So on and so forth, that is, the following byte interleave multiplexing processing is sequentially and cyclically executed for k times, k=3810, denoting here that the OPUC frame totally has 3810 columns. A one-dimensional array C[i] is used to denote the sequence of the byte interleave of the OPUC #i into the OPUCm, where C[i]=$C_i$, the value of the one-dimensional array C[i] is configured by the management or control platform to flexibly set the sequence of the byte interleave of the OPUC #i into the OPUCm.

for (k=1, k++, k<=3810)
{
for (i=1, i++, i<<m)
{

The content of the byte area of the kth columns in the four rows of the OPUC #i is used as the content of the byte area of the [m*(k−1)+C[i]]th columns in the four rows of the OPUCm.

The Payload Type (PT) in the fourth row of the first column of the OPUC overhead of the OPUC #x identifies the type of a service loaded by the OPUCm, for example, the type of the service loaded by the OPUC4 is 400GE.
}
}

A complete frame OPUCm #j is formed after the above-mentioned cyclic process is completed, where j is the number of the frame OPUCm, when j is an even number, the content of the byte areas of the first column to the mth column of the fourth row of the frame OPUCm #j (m bytes) is used as the PSI overhead byte of the OPUC. The following process is executed to assign a value to the PSI overhead byte.

for (i=1, i++, i<=m)
{
PSI[C[i]]=i,

Note: PSI[C[i]]=i denotes that the value of the byte of the C[i] column of the fourth row of the frame OPUCm #j is i where i is the number of the OPUC #i.

Note: for example, when the value of m is 10, $C_1$=2, $C_2$=3, $C_3$=4, $C_4$=1, $C_5$=7, $C_6$=8, $C_7$=9, $C_8$=6, $C_9$=5, $C_{10}$=10 denote that the sequence of the interleave of the frame OPUC #1 into the OPUCm is 2; the sequence of the interleave of the frame OPUC #2 into the OPUCm is 3; the sequence of the interleave of the frame OPUC #3 into the OPUCm is 4; the sequence of the interleave of the frame OPUC #4 into the OPUCm is 1; the sequence of the interleave of the frame OPUC #5 into the OPUCm is 7; the sequence of the interleave of the frame OPUC #6 into the OPUCm is 8; the sequence of the interleave of the frame OPUC #7 into the OPUCm is 9; the sequence of the interleave of the frame OPUC #8 into the OPUCm is 6; the sequence of the interleave of the frame OPUC #9 into the OPUCm is 5; and the sequence of the interleave of the frame OPUC #10 into the OPUCm is 10, thus, the values of the PSI are shown in the following Table, wherein PSI[1] denotes a byte in the first column of the fourth row in the frame OPUCm, PSI[10] denotes a byte in the tenth column of the fourth row in the frame OPUCm, and so on and so forth.

| | |
|---|---|
| PSI[1] | 4 |
| PSI[2] | 1 |
| PSI[3] | 2 |
| PSI[4] | 3 |
| PSI[5] | 9 |
| PSI[6] | 8 |
| PSI[7] | 5 |
| PSI[8] | 6 |
| PSI[9] | 7 |
| PSI[10] | 10 |

}
After the fram OPUCm formed by the foregoing processing flow is added with an ODU overhead, an ODUCm frame totally consisting of 4 rows and 14 columns is formed and marked as ODUCm.
j++;
}
As shown in FIG. 14, the foregoing processing flow is described below by taking the mapping of a 400GE Ethernet data stream into the OPUCm (m=4) as an example, where j is initialized to be 1.

If (there is data needing sending)
{
Step 1: a 400GE data stream is sequentially mapped to four OPUC sub-frames of OPUC #1, OPUC #2, OPUC #3 and OPUC #4; the OPUC, which is the frame structure of 4(row)*3810(column) defined by protocol G.709, includes an overhead area of 4(row)*2(column) and a payload area of 4(row)*3808(column). The first to the (4*3808)th bytes in the data stream are used as the payload content of the frame OPUC #1; the (4*3808+1)th to the (4*3808*2)th bytes are used as the payload content of the frame OPUC #2; the (4*3808*2+1)th to the (4*3808*3)th bytes are used as the payload content of the frame OPUC #3; and the (4*3808*3+1)th to the (4*3808*4)th bytes are used as the payload content of the frame OPUC #4. It should be noted that the taking out of the 4*3808 bytes in each cycle is logically equivalent to the disappearance of these bytes in the m*100G data stream, therefore, these bytes are not processed further, and the next 4*3808 byte area is taken as the payload content of the next OPUC frame.

Step 2: the four OPUC sub-frames are multiplexed into an OPUCm frame through byte interleave, and the OPUCm frame is marked as OPUCm #1. In the embodiment, m=4 denotes a rate of 4*100 Gb/s, and OPUC #1, OPUC #2, OPUC #3 and OPUC #4 are interleaved into the OPUCm according to a sequence of 1, 2, 3, 4, thus, the value of the PSI is shown in the following Table:

| | |
|---|---|
| PSI[1] | 1 |
| PSI[2] | 2 |
| PSI[3] | 3 |
| PSI[4] | 4 |

The byte content in the first columns of the four rows of the OPUC #1 is formed into the byte content in the first columns of the four rows of the OPUCm through a byte interleave method.

The byte content in the first columns of the four rows of the OPUC #2 is formed into the byte content in the second columns of the four rows of the OPUCm through a byte interleave method.

The byte content in the first columns of the four rows of the OPUC #3 is formed into the byte content in the third columns of the four rows of the OPUCm through a byte interleave method.

The byte content of the first columns in the four rows of the OPUC #4 is formed into the byte content of the fourth columns in the four rows of the OPUCm through a byte interleave method.

So on and so forth, that is, the following byte interleave multiplexing processing is sequentially and cyclically executed for k times, where k=3810,
for (k=1, k++, k<3810)
{
Step 2.1: the byte content of the kth columns in the four rows of the OPUC #1 is interleaved into the byte area of the [4(k−1)+PSI[1]] columns in the four rows of the OPUCm (m=4), wherein k denotes the kth column in the OPUC #1 frame, [4(k−1)+PSI[1]] denotes the [4(k−1)+PSI[1]] column in the OPUCm, totally having four bytes;

Step 2.2: the byte content of the kth columns in the four rows of the OPUC #2 is interleaved into the byte area of the [4(k−1)+PSI[2]] columns in the four rows of the OPUCm (m=4), wherein k denotes the kth column in the OPUC #2 frame, [4(k−1)+PSI[2]] denotes the [4(k−1)+PSI[2]] column in the OPUCm, totally having four bytes;

Step 2.3: the byte content of the kth columns in the four rows of the OPUC #3 is interleaved into the byte areas of the [4(k−1)+PSI[3]] columns in the four rows of the OPUCm (m=4), wherein k represents the kth column in the OPUC #3 frame, [4(k−1)+PSI[3]] represents the [4(k−1)+PSI[3]] column in the OPUCm, totally having four bytes;

Step 2.4: the byte content in the kth columns of the four rows of the OPUC #4 is interleaved into the byte area of the [4(k−1)+PSI[4]] columns in the four rows of the OPUCm (m=4), wherein k denotes the kth column in the OPUC #4 frame, [4(k−1)+PSI[4]] denotes the [4(k−1)+PSI[4]] column in the OPUCm, totally having four bytes;
}
When j is an even number, the bytes in the first to the fourth columns of the fourth row of the OPUCm #j are assigned with values 1, 2, 3 and 4, respectively.
j++;
}
Embodiment 3

In the implementation of embodiment 3, an ODUCm may be obtained by directly mapping a client service data stream into an OPUCm and adding an ODU overhead byte to the client service data stream; it is not necessary to obtain the ODUCm in the way described in embodiment 2. That is, the mapping of the client service data stream into an OPUCm can be realized through a related technology.

Embodiment 4

The ODUCm generated in embodiment 2 or 3 and the ODU4 in protocol G.709 may be both used as an input in embodiment 4. In embodiment 4, input is uniformly referred to as an ODUCm, where m is equal to or greater than 1. It should be noted that ODUC1 (m=1) herein is equivalent to the ODU4 defined in protocol G.709. The embodiment 4 illustrates how to multiplex y $ODUCm_s$ ($ODUCm_1$, $ODUCm_2$, $ODUCm_3$ ... $ODUCm_{(y−1)}$, $ODUCm_y$) into an ODUCn, where n=$m_1$+$m_2$+$m_3$+ ... +$m_{(y−1)}$+$m_y$.

Figure 15:
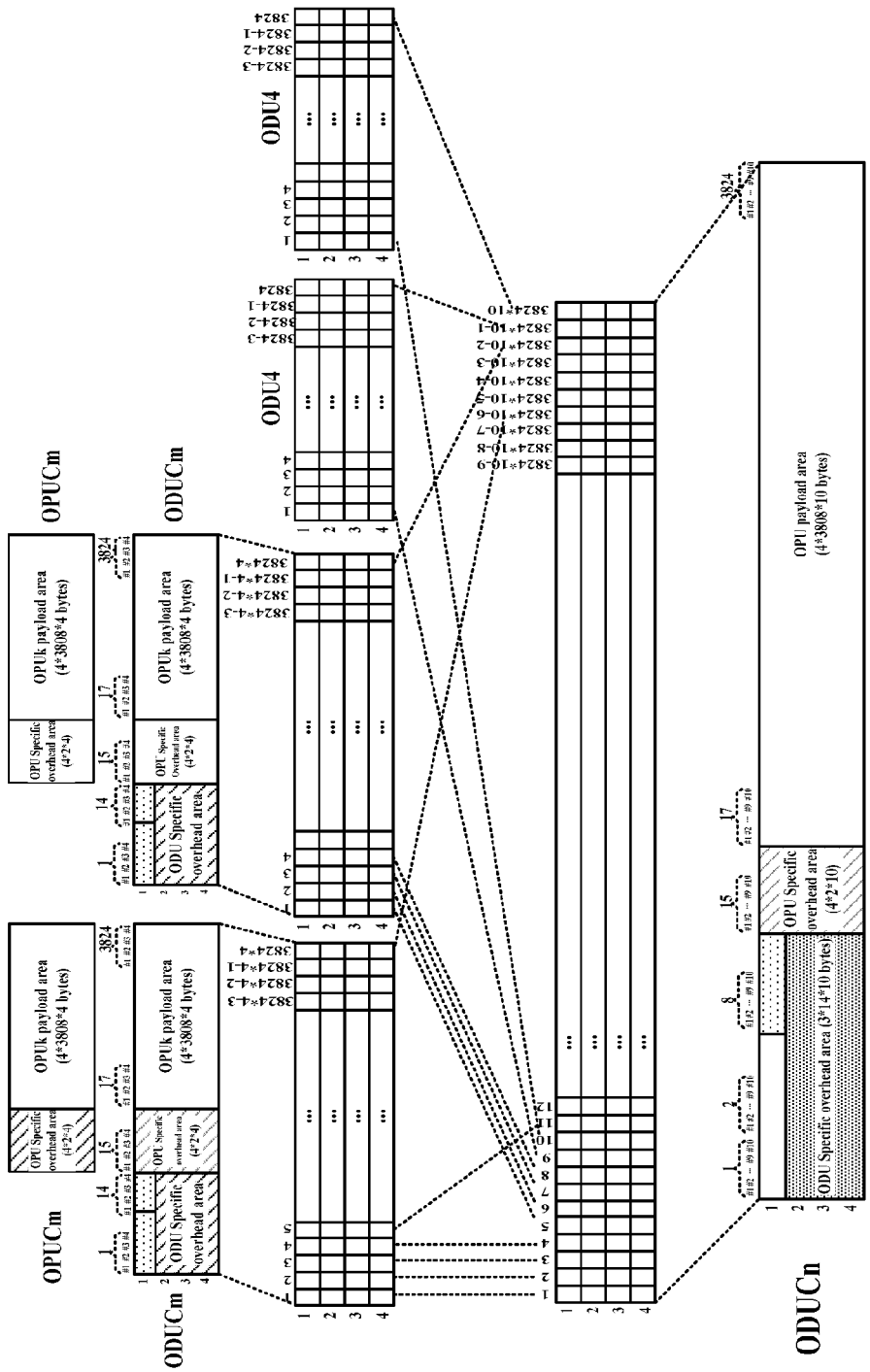
FIG. 15 is a schematic diagram showing a processing method for mapping and multiplexing data into an ODUCn according to embodiment 4 of the present disclosure.

FIG. 15 is a schematic diagram showing a processing method for mapping and multiplexing data into an ODUCn according to embodiment 4 of the present disclosure. As shown in FIG. 15, multiplexing the two $ODUCm_1$ and $ODUCm_2$ ($m_1$=$m_2$=4) which respectively bear a 400GE service and two 100G ODU4 into a 1 Tb/s ODUCn (n=10) according to a byte interleave method is taken as an example, wherein two ODU4 are marked as $ODUCm_3$ and $ODUCm_4$ ($m_3$=$m_4$=1), and $m_1$+$m_2$+$m_3$+$m_4$=10.

The byte areas of the first column to the mth columns (m=4), that is the byte areas (totally 16 bytes) of the first, the second, the third and the fourth columns, in the four rows of the $ODUCm_1$, are multiplexed into the byte areas of the first, the second, the third and the fourth columns in the four rows of the ODUCn frame according to a byte interleave method;

the byte areas of the first column to the mth columns (m=4), that is the byte areas (totally 16 bytes) of the first, the second, the third and the fourth columns, in the four rows of the $ODUCm_2$ are multiplexed into the byte areas of the fifth, the sixth, the seventh and the eighth columns in the four rows of the ODUCn frame according to a byte interleave method;

the byte areas of the first columns in the four rows of the $ODUCm_3$ (totally four bytes) are multiplexed into the byte areas in the ninth columns in the four rows of the OPUCn according to a byte interleave method;

the byte areas of the first columns in the four rows of the $ODUCm_4$ (totally four bytes) are multiplexed into the byte areas of the tenth columns in the four rows of the OPUCn according to a byte interleave method.

So on and so forth, that is, the following byte interleave multiplexing processing is sequentially and cyclically executed for k times, and in the embodiment, k=3824, n=10, $m_1$=4, $m_2$=4, $m_3$=1 and $m_4$=1.

Step 1: the byte areas from the $[m_1(k-1)+1]$th columns to the $[m_1(k-1)+m_1]$th columns in the four rows of the $ODUCm_1$ (totally 16 bytes) are multiplexed into the byte areas from the $[n(k-1)+1]$th columns to the $[n(k-1)+m_1]$th columns in the four rows of the OPUCn according to a byte interleave method; if the value of $m_1$ is 4 and the value of n is 10, that is, the byte areas of the $[4(k-1)+1]$th columns, the $[4(k-1)+2]$th columns, the $[4(k-1)+3]$th columns and the $[4(k-1)+4]$th columns in the four rows of the $ODUCm_1$ are multiplexed into the $[10(k-1)+1]$th columns, the $[10(k-1)+2]$th columns, the $[10(k-1)+3]$th columns and the $[10(k-1)+4]$th columns in the four rows of the ODUCn frame according to a byte interleave method.

Step 2: the byte areas from the $[m_2(k-1)+1]$th columns to the $[m_2(k-1)+m_2]$th columns in the four rows of the $ODUCm_2$ (totally 16 bytes) are multiplexed into the byte areas from the $[n(k-1)+m_1+1]$th columns to the $[n(k-1)+m_1+m_2]$th columns in the four rows of the OPUCn according to a byte interleave method; if the values of $m_1$ and $m_2$ are 4 and the value of n is 10, that is, the byte areas of the $[4(k-1)+1]$th columns, the $[4(k-1)+2]$th columns, the $[4(k-1)+3]$th columns and the $[4(k-1)+4]$th columns in the four rows of the $ODUCm_2$ are multiplexed into the $[10(k-1)+5]$th columns, the $[10(k-1)+6]$th columns, the $[10(k-1)+7]$th columns and the $[10(k-1)+8]$th columns in the four rows of the ODUCn frame according to a byte interleave method;

Step 3: the byte areas from the $[m_3(k-1)+1]$th columns to the $[m_3(k-1)+m_3]$th columns in the four rows of the $ODUCm_3$ (totally 16 bytes) are multiplexed into the byte areas from the $[n(k-1)+m_1+m_2+1]$th columns to the $[n(k-1)+m_1+m_2+m_3]$th columns in the four rows of the OPUCn according to a byte interleave method; if in the embodiment, the values of $m_1$ and $m_2$ are 4, the value of $m_3$ is 1, and the value of n is 10, then the byte areas in the kth columns in the four rows of the ODU4 (totally four bytes) are multiplexed into the byte areas of the $[10(k-1)+4+4+1]$th columns in the four rows of the OPUCn according to a byte interleave method.

Step 4: the byte areas from the $[m_4(k-1)+1]$th columns to the $[m_4(k-1)+m_4]$th columns in the four rows of the $ODUCm_4$ (totally 16 bytes) are multiplexed into the byte areas in the $[n(k-1)+m_1+m_2+m_3+1]$th columns to the $[n(k-1)+m_1+m_2+m_3+m_4]$th columns in the four rows of the OPUCn according to a byte interleave method; if in the embodiments, the values of $m_1$ and $m_2$ are 4, the values of $m_3$ and $m_4$ are 1, and the value of n is 10, then the byte areas of the kth columns in the four rows of the ODU4 (totally four bytes) are multiplexed into the byte areas of the $[10(k-1)+4+4+1+1]$th columns in the four rows of the OPUCn according to a byte interleave method.

Embodiment 5

Referring to FIG. 15, a processing method for demapping and demultiplexing data from the ODUCn generated in embodiment 4 is provided in embodiment 5. This processing method illustrates an example of demultiplexing two 400G ODUCm and two ODU4 from a 1 Tb/s ODUCn and further demapping two 400GE from the ODUCm at a data receiving terminal.

Step 1: two $ODUCm_1$ and $ODUCm_2$ which both bears a 400 GE service ($m_1$=$m_2$=4) and two 100G ODU4 (referred to as $ODUCm_3$ and $ODUCm_3$, $m_3$=$m_4$=1) are demultiplexed from an ODUCn a rate of which is 1 Tb/s (n=10) according to a byte interleave method, whose flow is as follows:

the byte areas from the first columns to the $(m_1)$th columns in the four rows of an ODUCn frame are demultiplexed into the content of byte areas from the first columns to the $(m_1)$th columns in the four rows of an $ODUCm_1$ frame according to a byte interleave method. In the embodiment, the value of $m_1$ is 4, that is the byte content of the first, the second, the third and the fourth columns in the four rows of the ODUCn frame is used as the byte areas of the first, the second, the third and the fourth columns in the four rows of the $ODUCm_1$ (totally 16 bytes);

the byte areas from the $(m_1+1)$th columns to the $(m_1+m_2)$th columns in the four rows of the ODUCn frame are demultiplexed into the content of byte areas from the first columns to the $(m_2)$th columns in the four rows of an $ODUCm_2$ frame according to a byte interleave method; in the embodiment, the value of $m_2$ is 4, that is the byte content of the fifth, the sixth, the seventh and the eighth columns in the four rows of the ODUCn frame is used as the byte areas of the first, the second, the third and the fourth columns in the four rows of the $ODUCm_2$ (totally 16 bytes);

the byte areas of the ninth columns in the four rows of the ODUCn (totally four bytes) are multiplexed into the byte areas of the first columns in the four rows of the $ODUCm_3$ according to a byte interleave method.

The byte areas of the tenth columns in the four rows of the ODUCn (totally four bytes) are multiplexed into the byte areas of the first columns in the four rows of the $ODUCm_4$ using a byte interleave method.

So on and so forth, that is the following byte interleave demultiplexing processing is sequentially and cyclically executed for k times, for (k=1, k++, k<=3824)
{

Step 1.1: the byte areas from the $[10(k-1)+1]$th columns to the $[10(k-1)+m_1]$th columns in the four rows of the ODUCn are demultiplexed into the content of byte areas from the $[4(k-1)+1]$th columns to the $[4(k-1)+m_1]$th columns in the four rows of the $ODUCm_1$, which is totally 16 bytes, according to a byte interleave method. The value of $m_1$ is 4. That is the byte areas of the $[10(k-1)+1]$th columns, the $[10(k-1)+2]$th columns, the $[10(k-1)+3]$th columns and the $[10(k-1)+4]$th columns in the four rows of the ODUCn frame are demultiplexed into the byte areas of the $[4(k-1)+1]$th columns, the $[4(k-1)+2]$th columns, the $[4(k-1)+3]$th columns and the $[4(k-1)+4]$th columns in the four rows of the $ODUCm_1$ according to a byte interleave method.

Step 1.2: the byte areas from the $[10(k-1)+m_1+1]$th columns to the $[10(k-1)+m_1+m_2]$th columns in the four rows of the ODUCn frame are demultiplexed into the content of byte areas from the $[4(k-1)+1]$th columns to the $[4(k-1)+m_2]$th columns in the four rows of the $ODUCm_2$, which is totally 16 bytes, according to a byte interleave method. In the embodiment, the value of m is 4, that is the byte areas of the $[10(k-1)+5]$th columns, the $[10(k-1)+6]$th columns, the $[10(k-1)+7]$th columns and the $[10(k-1)+8]$th columns in the four rows of the ODUCn frame are demultiplexed into the content of byte areas of the $[4(k-1)+1]$th columns, the $[4(k-1)+2]$th columns, the $[4(k-1)+3]$th columns and the $[4(k-1)+4]$th columns in the four rows of the $ODUCm_2$ according to a byte interleave method.

Step 1.3, the byte areas in the $[10(k-1)+m_1+m_2+1]$th columns in the four rows of the ODUCn are demultiplexed into the byte areas in the kth columns in the four rows of the $ODUCm_3$ (totally 4 bytes) using a byte interleave method.

Step 1.4, the content of byte areas of the $[10(k-1)+m_1+m_2+m_3+1]$th columns in the four rows of the ODUCn frame are demultiplexed into the content of byte areas of the kth columns in the four rows of the $ODUCm_4$ according to a byte interleave method.
}

In the embodiment, k=3824, n=10, $m_1$=4, $m_2$=4, $m_3$=1 and $m_4$=1.

Embodiment 6

Referring to FIG. 14, a processing method for demapping data from the ODUCm generated in embodiment 2 is provided in the embodiment, and the embodiment provides the processing method demapping two 400G ODUCm into 400GE at a data receiving terminal.

Step 1: ODU and OTU overhead areas are removed from two frames $ODUCm_1$ and $ODUCm_2$ which both bear 400 GE, and then the two frames $ODUCm_1$ and $ODUCm_2$ are two frames $OPUCm_1$ and $OPUCm_2$. If the OPUCm is generated at a sending terminal in the way described in embodiment 2, the following steps are continued to be executed, otherwise, data streams of two 400GE services are directly demapped from $OPUCm_1$ and $OPUCm_2$.

Step 2: $m_1$ OPUC sub-frames are demultiplexed from the $OPUCm_1$ through a byte interleave method according to the processing flow described below. In the embodiment, the value of $m_1$ is 4, and $m_1$ OPUC sub-frames are respectively marked as OPUC #1, OPUC #2, OPUC #3 and OPUC #4. The receiving terminal generates values of PSI[1], PSI[2] . . . PSI[$m_1$] according to the content of the first columns to the ($m_1$)th columns in the four rows of the $ODUCm_1$ frame numbered as an even number, wherein #(PSI[i]) denotes the number of an OPUC frame, for example, PSI[1]=3 denotes OPUC #3, where 1=<i<=$m_1$.

The byte content of the first columns in the four rows of the $ODUCm_1$ (totally four bytes) is demultiplexed into the byte content of the first columns in the four rows of the OPUC#(PSI[1]) according to a byte interleave method.

The byte content of the second columns in the four rows of the $ODUCm_1$ (totally four bytes) is demultiplexed into the byte content of the first columns in the four rows of the OPUC#(PSI[2]) according to a byte interleave method.

The byte content of the third columns in the four rows of the $ODUCm_1$ (totally four bytes) is demultiplexed into the byte content of the first columns in the four rows of the OPUC#(PSI[3]) according to a byte interleave method.

The byte content of the fourth columns in the four rows of the $ODUCm_1$ (totally four bytes) is demultiplexed into the byte content of the first columns in the four rows of the OPUC#(PSI[4]) according to a byte interleave method.

So on and so forth, that is the following byte interleave multiplexing processing is sequentially and cyclically executed for k times,
for (k=1, k++, k<=3810)
{
Step 3.1: the byte areas of the ($m_1$*(k−1)+1)th columns in the four rows of the $OPUCm_1$($m_1$=4) are demultiplexed into the byte content of the kth columns in the four rows of the OPUC#(PSI[1]) according to a byte interleave method, wherein k denotes the kth column in the OPUC#(PSI[1]) frame, and ($m_1$*(k−1)+1) denotes the [($m_1$*(k−1)+1)] column in the $OPUCm_1$, totally having four bytes;

Step 3.2: the byte areas of the ($m_1$*(k−1)+2)th columns in the four rows of the $OPUCm_1$($m_1$=4) are demultiplexed into the byte content of the kth columns in the four rows of the OPUC#(PSI[2]) according to a byte interleave method, wherein k denotes the kth column in the OPUC#(PSI[2]) frame, and ($m_1$(k−1)+2) denotes the [($m_1$*(k−1)+2)] column in the $OPUCm_1$, totally having four bytes;

Step 3.3: the byte areas of the ($m_1$*(k−1)+3)th columns in the four rows of the $OPUCm_1$($m_1$=4) are demultiplexed into the byte content of the kth columns in the four rows of the OPUC#(PSI[3]) according to a byte interleave method, wherein k denotes the kth column in the OPUC#(PSI[3]) frame, and ($m_1$*(k−1)+3) denotes the [($m_1$(k−1)+3)] column in the $OPUCm_1$, totally having four bytes;

Step 3.4: the byte areas of the ($m_1$*(k−1)+4)th columns in the four rows of the $OPUCm_1$($m_1$=4) are demultiplexed into the byte content of the kth columns in the four rows of the OPUC#(PSI[4]) according to a byte interleave method, wherein k denotes the kth column in the OPUC#(PSI[4]) frame, and ($m_1$(k−1)+1) denotes the [($m_1$(k−1)+1)] column in the $OPUCm_1$, totally having four bytes;
}
wherein k=3810, $m_1$=4

Step 4: $m_2$ OPUC of the $OPUCm_2$ are demultiplexed in the way described in Step 3; and Step 5: the $m_1$ or $m_2$ OPUC frames demapped by the $OPUCm_1$ and the $OPUCm_2$ are sequentially demapped into a 400GE data stream.

To sum up, by sequentially mapping an Ethernet service data stream a rate of which is m*100 Gb/s into m OPUC and multiplexing the m OPUC into one OPUCm a rate of which is m*100 Gb/s according to a way of byte interleave and adding an ODU overhead to the head of the OPUCm to obtain an ODUCm a rate of which is m*100 Gb/s, the present disclosure addresses the problem of how to map and multiplex data effectively after a Flexible Grid technology is introduced into the related art, enables the operator to deploy a beyond-100G optical transfer system more flexibly and improves the spectral efficiency of optical fiber and the flexibility and the compatibility of a system.

Obviously, those skilled in the art shall understand that the above-mentioned components or steps of the present disclosure can be realized by using general purpose calculating device, can be integrated in one calculating device or distributed on a network which consists of a plurality of calculating devices. Alternatively, the components or the steps of the present disclosure can be realized by using the executable program code of the calculating device. Consequently, they can be stored in the storing device and executed by the calculating device, and under some circumstances, the shown or described steps can be executed in different orders, or they are made into integrated circuit component respectively, or a plurality of components or steps thereof are made into one integrated circuit component. In this way, the present disclosure is not restricted to any particular hardware and software combination.

The descriptions above are only the example embodiment of the present disclosure, which are not used to restrict the present disclosure. For those skilled in the art, the present disclosure may have various changes and variations. Any amendments, equivalent substitutions, improvements, etc. within the principle of the present disclosure are all included in the scope of the protection of the present disclosure.

What is claimed is:

1. A data mapping and multiplexing method, comprising:
mapping an Ethernet service data stream a rate of which is m*100 Gb/s sequentially into m Optical Payload Unit Sub-frames (OPUC) and multiplexing the m OPUC into one Optical Payload Unit Frame (OPUCm) a rate of which is m*100 Gb/s according to a way of byte interleave, where m is a positive integer; and adding an Optical Channel Data Unit (ODU) overhead to a head of the OPUCm to obtain an Optical Channel Data Unit Frame (ODUCm) a rate of which is m*100 Gb/s;
wherein a frame structure of each frame of the m OPUC consists of 4 rows and 3810 columns; a frame structure of the OPUCm consists of 4 rows and 3810*m columns; and a frame structure of the ODUCm consists of 4 rows and 3824*m columns.

2. The method according to claim 1, wherein multiplexing the m OPUC into the one OPUCm the rate of which is m*100 Gb/s according to the way of byte interleave comprises:
sequentially extracting bytes of each column of the m OPUC, starting from bytes of the first column and ending with bytes of the last column; and
sequentially combing groups of multiplexed bytes to obtain the OPUCm the rate of which is m*100 Gb/s, wherein each group of the groups of multiplexed bytes consists of bytes extracted from the same column of various frames of the m OPUC.

3. The method according to claim 2, wherein sequentially combing the groups of multiplexed bytes, wherein each group of the groups of multiplexed bytes consists of the bytes extracted from the same column of various frames of the m OPUC comprises:
using content of a byte area which is extracted from the kth column of the ith sub-frame of the m OPUC as content of a byte area of the $[m*(k-1)+C_i]$th column of the multiplexed OPUCm the rate of which is m*100 Gb/s,
where i and k are both integers; $1 \leq i \leq m$; $1 \leq k \leq 3810$; $C_i$ denotes a sequence of interleave bytes of the ith OPUC into the OPUCm, $C_i \in \{1, 2, 3, \ldots, m-1, m\}$, and a value of each $C_i$ is different.

4. The method according to claim 3, comprising:
sequentially carrying, in byte areas from the first column to the mth column in the fourth row of overhead of each even-numbered OPUCm, m sequence values $C_i$ denoting the sequences of interleaving the bytes of various OPUC into the OPUCm,
wherein content of the byte areas from the first column to the mth column in the fourth row of the overhead of the OPUCm forms a Payload Structure Identifier (PSI) which denotes the sequences of interleaving the bytes of various OPUC into the OPUCm.

5. The method according to claim 1, wherein after adding the ODU overhead to the head of the OPUCm to obtain the ODUCm the rate of which is m*100 Gb/s, the method further comprises:
multiplexing a plurality of the ODUCm into one ODUCn according to the way of byte interleave, wherein a rate of the ODUCn is a sum of rates of the plurality of the ODUCm and marked as n*100 Gb/s; where n is a positive integer, and m<=n; and
adding an Optical Channel Transport Unit (OTU) overhead to a head of the ODUCn to obtain an Optical Channel Transport Unit Frame (OTUCn).

6. The method according to claim 5, wherein multiplexing the plurality of ODUCm into the one ODUCn according to the way of byte interleave comprises:
sequentially adding r ODUCm, rates of which are $m_1*100$ Gb/s, $m_2*100$ Gb/s, $m_3*100$ Gb/s ... $m_{(r-1)}*100$ Gb/s and $m_r*100$ Gb/s respectively, into the one ODUCn according to the way of byte interleave, wherein content of byte areas from the $[[m_x*(k-1)]$th column to the $[m_x*(k-1)+m_x]$th column of an ODUCm$_x$ is used as content of byte areas from the $[n*(k-1)+m_1+m_2+ \ldots +m_{(x-1)}+1]$th column to the $[n*(k-1)+m_1+m_2+ \ldots +m_{(x-1)}+m_x]$th column of the multiplexed ODUCn,
where $m_1$, $m_2$, $m_3$ ... $m_{(r-1)}$ and $m_r$ are all positive integers; $m_1+M_2+M_3+ \ldots +m_{(r-1)}+m_r=n$; $1 \leq k \leq 3824$; $x \leq r$; x, r and k are all positive integers; when a value of m is 1, the ODUCm denotes ODU4; and $m_x \in \{m_1, m_2, m_3, \ldots, m_{(r-1)}, m_r\}$.

7. A method for demultiplexing and demapping the data mapped and multiplexed by the mapping and multiplexing method of claim 4, comprising:
obtaining the OPUCm by removing the ODU overhead from the received ODUCm, and demultiplexing the m OPUC from the OPUCm according to the way of byte interleave, wherein content of the byte area of the $[m*(k-1)+i]$th column in the OPUCm is used as content of the byte area of the kth column of the PS[i]th OPUC according to values of PSI[1], PSI[2] ... PSI[m] formed by content from the first column to the mth column in the fourth row of the received even-numbered OPUCm; and
sequentially demapping the m demultiplexed OPUC into the one Ethernet service data stream the rate of which is m*100 Gb/s;
wherein PSI[i] denotes that the sequence of interleaving the bytes of the PSI[i]th OPUC into the OPUCm is i.

8. A method for demultiplexing and demapping the data mapped and multiplexed by the mapping and multiplexing method of claim 6, comprising:
obtaining the r ODUCm$_x$ contained in one ODUCn received, wherein according to the way of byte interleave, content of the byte areas from the $[n*(k-1)+m_1+m_2+ \ldots +m_{(x-1)}+1]$th column to the $[n*(k-1)+m_1+m_2+ \ldots +m_{(x-1)}+m_x]$th column of the ODUCn sequentially is used as content of the byte areas from the $[[m_x*(k-1)+1]$th column to the $[m_x*(k-1)+m_x]$th column of the ODUCm$_x$.

9. An optical signal sending node, comprising:
a mapping component, configured to map an Ethernet service data stream a rate of which is m*100 Gb/s sequentially into m OPUC, where m is a positive integer, wherein a frame structure of the OPUC consists of 4 rows and 3810 columns;
a first multiplexing component, configured to multiplex the m OPUC into one OPUCm a rate of which is m*100 Gb/s according to a way of byte interleave, wherein the frame structure of the OPUCm consists of 4 rows and 3810*m columns; and
a first framing component, configured to add an ODU overhead to a head of the OPUCm to obtain an ODUCm a rate of which is m*100 Gb/s, wherein a frame structure of the ODUCm consists of 4 rows and 3824*m columns.

10. The sending node according to claim 9, wherein the first multiplexing component further comprises:
an extraction unit, configured to sequentially extract bytes of each column of the m OPUC, starting from bytes of the first column and ending with bytes of the last column; and
a first byte interleave unit, configured to sequentially combine groups of multiplexed bytes to obtain the OPUCm the rate of which is m*100 Gb/s, wherein each group of the groups of multiplexed bytes consists of bytes extracted from the same column of various frames of the m OPUC.

11. The sending node according to claim 10, wherein the first byte interleave unit is further configured to use content of a byte area which is extracted from the kth column of the ith sub-frame of the m OPUC as content of a byte area of the $[m*(k-1)+C_i]$th column of the multiplexed OPUCm the rate of which is m*100 Gb/s, wherein i and k are both integers; $1 \leq i \leq m$; $1 \leq k \leq 3810$; $C_i$ denotes a sequence of interleave bytes of the ith OPUC into the OPUCm, $C_i \in \{1, 2, 3, \ldots, m-1, m\}$, and a value of each $C_i$ is different.

12. The sending node according to claim 11, wherein the first byte interleave unit is further configured to sequentially carry, in byte areas from the first column to the mth column in the fourth row of overhead of each even-numbered OPUCm, m sequence values $C_i$ denoting the sequences of interleaving the bytes of various OPUC into the OPUCm, wherein content of the byte areas from the first column to the mth column in the fourth row of the overhead of the OPUCm forms a Payload Structure Identifier (PSI) which denotes the sequences of interleaving the bytes of various OPUC into the OPUCm.

13. The sending node according to claim 9, comprising:
a second multiplexing unit, configured to multiplex a plurality of the ODUCm into one ODUCn according to the way of byte interleave, wherein a rate of the ODUCn is a sum of rates of the plurality of the ODUCm and marked as n*100 Gb/s; where n is a positive integer, and m<=n; and
a second framing component, configured to add an OTU overhead to a head of the ODUCn to obtain an OTUCn.

14. The sending node according to claim 13, wherein the second multiplexing component is further configured to sequentially add r ODUCm, the rates of which are $m_1*100$ Gb/s, $m_2*100$ Gb/s, $m_3*100$ Gb/s ... $m_{(r-1)}*100$ Gb/s and $m_r*100$ Gb/s respectively, into the one ODUCn according to the way of byte interleave, wherein the content of byte areas from the $[[m_x*(k-1)]$th column to the $[m_x*(k-1)+m_x]$th column of an ODUCm$_x$ is used as content of byte areas from the $[n*(k-1)+m_1+m_2+ \ldots +m_{(x-1)}+1]$th column to the $[n*(k-1)+m_1+m_2+ \ldots +m_{(x-1)}+m_x]$th column of the multiplexed ODUCn, wherein $m_1, m_2, m_3 \ldots m_{(r-1)}$ and $m_r$ are all positive integers; $m_1+m_2+m_3+ \ldots +m_{(r-1)}+m_r=n$; $1 \leq k \leq 3824$; $x \leq r$; x, r and k are all positive integers; when a value of m is 1, the ODUCm denotes ODU4; and $m_x \in \{m_1, m_2, m_3, \ldots, m_{(r-1)}, m_r\}$.

15. A receiving node for receiving the optical signal sent from the sending node of claim 12, comprising:
a first demultiplexing component, configured to obtain the OPUCm by removing the ODU overhead from the received ODUCm, and demultiplex the m OPUC from the OPUCm according to the way of byte interleave, wherein content of the byte area of the $[m*(k-1)+i]$th column in the OPUCm is used as content of the byte area of the kth column of the PS[i]th OPUC according to the values of PSI[1], PSI[2] ... PSI[m] formed by content from the first column to the mth column in the fourth row of the received even-numbered OPUCm, wherein PSI[i] denotes that the sequence of interleaving the bytes of the PSI[i]th OPUC into the OPUCm is i; and
a demapping component, configured to sequentially demap the m demultiplexed OPUC into the one Ethernet service data stream the rate of which is m*100 Gb/s.

16. A receiving node for receiving the optical signal sent from the sending node of claim 14, comprising:
a second demultiplexing component, configured to obtain the r ODUCm$_x$ contained in one ODUCn received, wherein according to the way of byte interleave, content of the byte areas from the $[n*(k-1)+m_1+m_2+ \ldots +m_{(x-1)}+1]$th column to the $[n*(k-1)+m_1+m_2+ \ldots +m_{(x-1)}+m_x]$th column of the ODUCn sequentially is used as content of the byte areas from the $[[m_x*(k-1)+1]$th column to the $[m_x*(k-1)+m_x]$th column of the ODUCm$_x$.

17. An optical signal transfer system, comprising an optical signal sending node and the receiving node of claim 15, wherein the optical signal sending node comprises:
a mapping component, configured to map an Ethernet service data stream a rate of which is m*100 Gb/s sequentially into m OPUC, wherein a frame structure of the OPUC consists of 4 rows and 3810 columns, where m is a positive integer;
a first multiplexing component, configured to multiplex the m OPUC into one OPUCm a rate of which is m*100 Gb/s according to a way of byte interleave, wherein the frame structure of the OPUCm consists of 4 rows and 3810*m columns; and
a first framing component, configured to add an ODU overhead to a head of the OPUCm to obtain an ODUCm a rate of which is m*100 Gb/s, wherein a frame structure of the ODUCm consists of 4 rows and 3824*m columns;
wherein the first multiplexing component further comprises:
an extraction unit, configured to sequentially extract bytes of each column of the m OPUC, starting from bytes of the first column and ending with bytes of the last column; and
a first byte interleave unit, configured to sequentially combine groups of multiplexed bytes to obtain the OPUCm the rate of which is m*100 Gb/s, wherein each group of the groups of multiplexed bytes consists of bytes extracted from the same column of various frames of the m OPUC, wherein the first byte interleave unit is further configured to use content of a byte area which is extracted from the kth column of the ith sub-frame of the m OPUC as content of a byte area of the $[m*(k-1)+C_i]$th column of the multiplexed OPUCm the rate of which is m*100 Gb/s, wherein i and k are both integers; $1 \leq i \leq m$; $1 \leq k \leq 3810$; $C_i$ denotes a sequence of interleave bytes of the ith OPUC into the OPUCm, $C_i \in \{1, 2, 3, \ldots, m-1, m\}$, and a value of each $C_i$ is different, wherein the first byte interleave unit is further configured to sequentially carry, in byte areas from the first column to the mth column in the fourth row of overhead of each even-numbered OPUCm, m sequence values $C_i$ denoting the sequences of interleaving the bytes of various OPUC into the OPUCm, wherein content of the byte areas from the first column to the mth column in the fourth row of the overhead of the OPUCm forms a Payload Structure Identifier (PSI) which denotes the sequences of interleaving the bytes of various OPUC into the OPUCm.

18. An optical signal transfer system, comprising an optical signal sending node and the receiving node of claim 16, wherein the optical signal sending node comprises:
a mapping component, configured to map an Ethernet service data stream a rate of which is m*100 Gb/s sequentially into m OPUC, wherein a frame structure of the OPUC consists of 4 rows and 3810 columns, where m is a positive integer;
a first multiplexing component, configured to multiplex the m OPUC into one OPUCm a rate of which is m*100 Gb/s according to a way of byte interleave, wherein the frame structure of the OPUCm consists of 4 rows and 3810*m columns; and a first framing component, configured to add an ODU overhead to a head of the OPUCm to obtain an ODUCm a rate of which is m*100 Gb/s, wherein a frame structure of the ODUCm consists of 4 rows and 3824*m columns;

wherein the sending node, comprising:

a second multiplexing unit, configured to multiplex a plurality of the ODUCm into one ODUCn according to the way of byte interleave, wherein a rate of the ODUCn is a sum of rates of the plurality of the ODUCm and marked as n*100 Gb/s; where n is a positive integer, and m<=n; and a second framing component, configured to add an OTU overhead to a head of the ODUCn to obtain an OTUCn;

wherein the second multiplexing component is further configured to sequentially add r ODUCm, the rates of which are $m_1$*100 Gb/s, $m_2$*100 Gb/s, $m_3$*100 Gb/s ... $m_{(r-1)}$*100 Gb/s and $m_r$*100 Gb/s respectively, into the one ODUCn according to the way of byte interleave, wherein the content of byte areas from the $[[m_x*(k-1)]$th column to the $[m_x*(k-1)+m_x]$th column of an $ODUCm_x$ is used as content of byte areas from the $[n*(k-1)+m_1+m_2+\ldots+m_{(x-1)}+1]$th column to the $[n*(k-1)+m_1+m_2+\ldots+m_{x-1}+m_x]$th column of the multiplexed ODUCn, wherein $m_1$, $m_2$, $m_3$ ... $m_{(r-1)}$ and $m_r$ are all positive integers;

$m_1+m_2+m_3+\ldots+m_{(r-1)}+m_r=n$; $1 \leq k \leq 3824$; $x \leq r$; x, r and k are all positive integers; when a value of m is 1, the ODUCm denotes ODU4; and $m_x \in \{m_1, m_2, m_3, \ldots, m_{(r-1)}, m_r\}$.

* * * * *